United States Patent
Kobayashi

(10) Patent No.: US 6,501,489 B1
(45) Date of Patent: Dec. 31, 2002

(54) CURVE SLIDER APPARATUS

(75) Inventor: Takahiro Kobayashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/412,505

(22) Filed: Oct. 5, 1999

(30) Foreign Application Priority Data

Feb. 25, 1999 (JP) .......................................... 11-047474

(51) Int. Cl.$^7$ ................................................ G06F 3/00
(52) U.S. Cl. ........................ 345/833; 345/764; 345/784; 345/856; 345/863
(58) Field of Search ................................ 345/833, 764, 345/441, 442, 443, 473, 802, 784, 786, 856, 863

(56) References Cited

U.S. PATENT DOCUMENTS

| | | | |
|---|---|---|---|
| 5,615,347 A | * 3/1997 | Davis et al. ................. | 345/839 |
| 5,815,400 A | * 9/1998 | Hirai et al. ............. | 364/474.15 |
| 5,977,972 A | * 11/1999 | Bates et al. ................. | 345/784 |
| 6,072,490 A | * 6/2000 | Bates et al. ................. | 345/808 |
| 6,157,381 A | * 12/2000 | Bates et al. ................. | 345/784 |
| 6,229,456 B1 | * 5/2001 | Engholm et al. ............. | 341/35 |
| 6,357,040 B1 | * 3/2002 | Porter ........................... | 717/9 |

FOREIGN PATENT DOCUMENTS

| | | |
|---|---|---|
| JP | 4-70729 | 3/1992 |
| JP | 7-248726 | 9/1995 |
| JP | 8-251527 | 9/1996 |

* cited by examiner

*Primary Examiner*—Raymond J. Bayerl
*Assistant Examiner*—Cuong T. Thai
(74) *Attorney, Agent, or Firm*—Staas & Halsey LLP

(57) ABSTRACT

A display coordinate and operation value conversion table 13 is provided in a computer 10. The conversion table 13 stores the correspondence between, the coordinate position of a curve slider (reference line) formed in a specified area 14, and the animation, etc. displayed in the operation target display area 15. With the configuration, a desired position on the curve slider (reference line) is specified by a mouse, etc., the display coordinate and operation value conversion table 13 is searched based on the coordinate data of the corresponding pointer, and the animation is displayed in the operation target display area 15 by reading the corresponding animation data, thereby easily obtaining the corresponding animation at the pointer specified in the specified area 14 on the display 11, and displaying a curve slider with high operability.

15 Claims, 30 Drawing Sheets

| DISPLAYED x COORDINATE | DISPLAYED y COORDINATE | ANIMATION TIME |
|---|---|---|
| 120 | 70 | 00:00 |
| 150 | 64 | 01:20 |
| 128 | 145 | 04:25 |
| 166 | 147 | 08:54 |

FIG. 5

| DISPLAYED x COORDINATE | DISPLAYED y COORDINATE | NOISE LEVEL |
|---|---|---|
| 120 | 70 | 40 |
| 150 | 64 | 90 |
| 128 | 145 | 100 |
| 166 | 147 | 60 |

FIG. 11

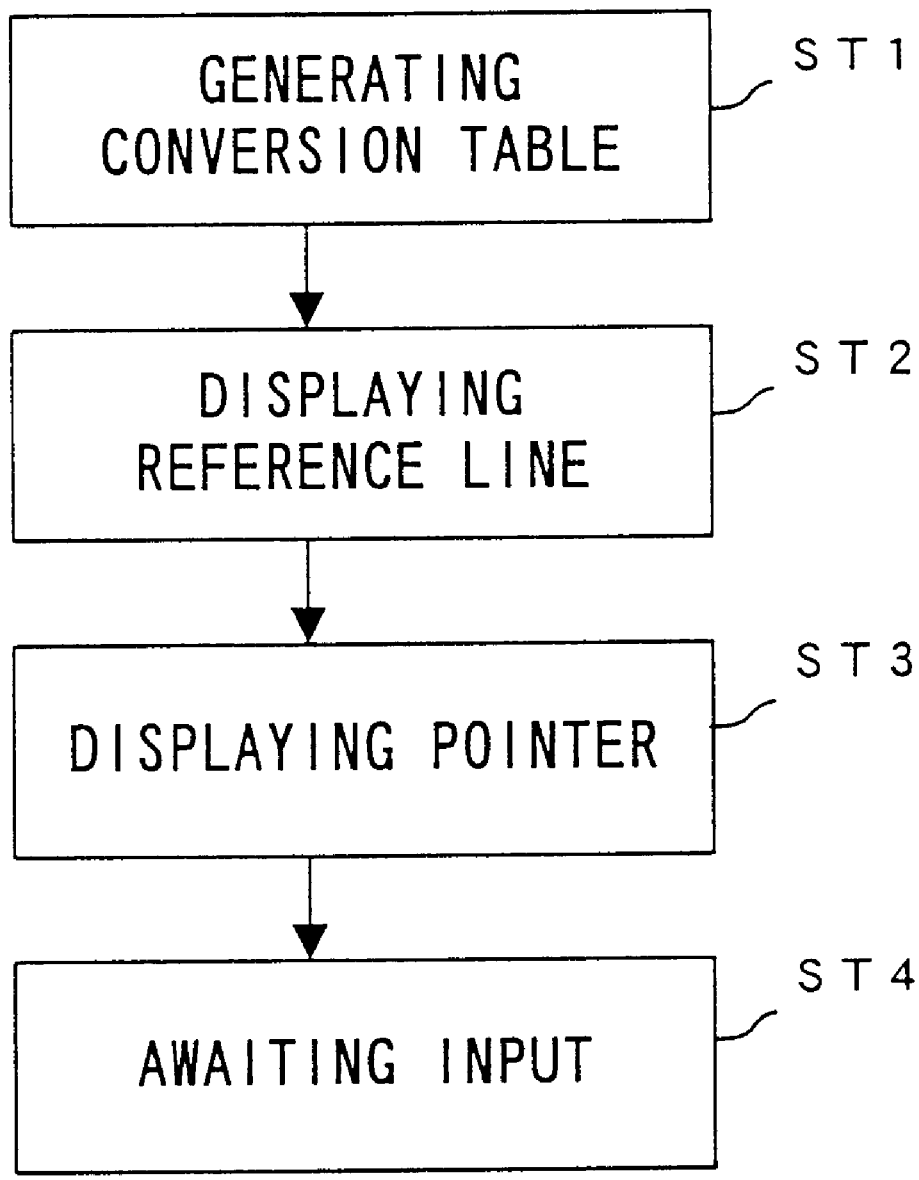
F I G. 1 2

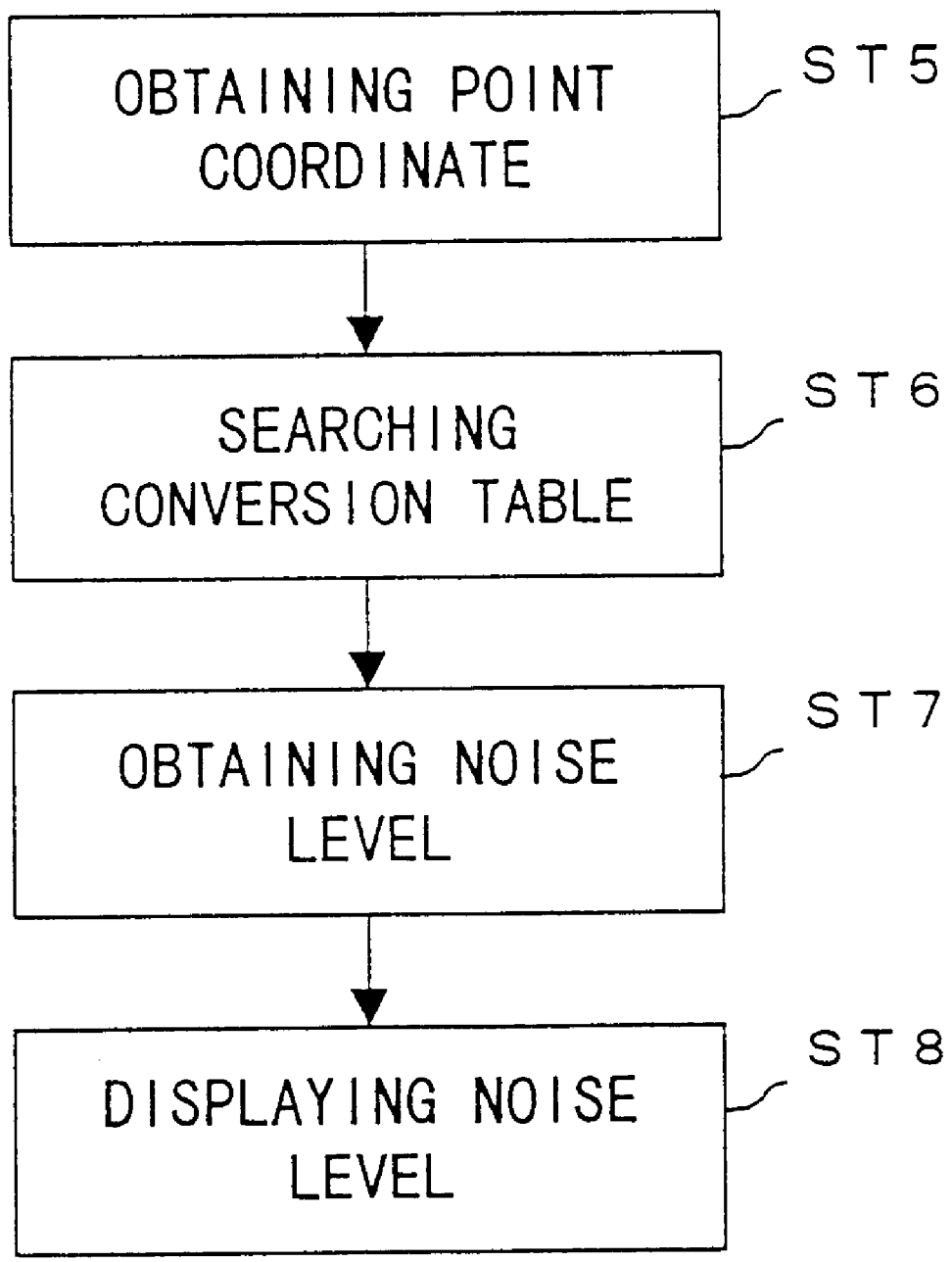
F I G. 13

| DISPLAYED x COORDINATE | DISPLAYED y COORDINATE | TEMPERATURE (°C) | HUMIDITY |
|---|---|---|---|
| 120 | 70 | 23.4 | 63% |
| 150 | 64 | 24.2 | 50% |
| 132 | 145 | 24.8 | 48% |
| 166 | 147 | 22.5 | 70% |

FIG. 16

| DISPLAYED x COORDINATE | DISPLAYED y COORDINATE | ANIMATION TIME | CURVE INTERPOLATION |
|---|---|---|---|
| 120 | 70 | 00:00 | NO |
| 150 | 64 | 01:20 | NO |
| 90 | 120 | 04:03 | YES |
| 110 | 150 | 05:08 | NO |
| 166 | 147 | 08:54 | — |

FIG. 19

| DISPLAYED x COORDINATE | DISPLAYED y COORDINATE | ANIMATION TIME |
|---|---|---|
| 120 | 70 | 00:00 |
| 150 | 64 | 01:20 |
| 90 | 120 | 04:03 |
| 85 | 132 | 04:18 |
| 87 | 142 | 04:34 |
| 94 | 148 | 04:50 |
| 110 | 150 | 05:08 |
| 166 | 147 | 08:54 |

FIG. 20

| DISPLAYED x COORDINATE | DISPLAYED y COORDINATE | ANIMATION TIME | MOVING UNIT |
|---|---|---|---|
| 120 | 70 | 00:00 | CAR |
| 150 | 64 | 01:20 | CAR |
| 100 | 145 | 04:25 | ON FOOT |
| 166 | 147 | 08:54 | — |

FIG. 24

| DISPLAYED x COORDINATE | DISPLAYED y COORDINATE | ANIMATION TIME | DIRECTION OF CAMERA |
|---|---|---|---|
| 120 | 70 | 00:00 | 15° |
| 150 | 64 | 01:20 | 252° |
| 128 | 145 | 04:25 | 0° |
| 166 | 147 | 08:54 | 0° |

FIG. 26

| x COORDINATE | y COORDINATE | z COORDINATE | ANIMATION TIME |
|---|---|---|---|
| 140 | 98 | 50 | 00:00 |
| 277 | 100 | 70 | 01:01 |
| 224 | 176 | 97 | 02:14 |
| 347 | 190 | 128 | 03:37 |

CURVE SLIDER APPARATUS

BACKGROUND OF THE INVENTION

1. Field of the Invention

The present invention relates to a curve slider apparatus forming part of an user interface.

2. Description of the Prior Art

The slider apparatus forming part of a user interface displays, for example, a reference line on the screen of a computer, has a pointer on the reference line, and converts the position of the pointer into a numeral expression so that a visually comprehensible operation can be realized. For example, when animation and the slider apparatus is combined, one end of the reference line corresponds to the starting position of the animation, and the other end of the reference line corresponds to the ending position of the animation. In addition, when the user moves the pointer using a pointing device (for example, a mouse), the animation is regenerated based on the position of the pointer and the moving speed. Therefore, when the moving speed is high, the animation is played back in a fast-forward mode. When the moving speed is low, the animation is played back in a slow mode.

FIG. 1 shows the above described slider apparatus. A display 1 of a personal computer, etc. is used for animation display 2 and slider display 3. The slider display 3 is formed by a reference line 4 and a pointer 5. The slider display 3 refers to a graphical display located at the lower part of the display 1. As described above, one end (for example, the leftmost point) of the reference line 4 corresponds to the starting position of the animation displayed on the animation display 2, and the other end (for example, the rightmost point) of the reference line 4 corresponds to the ending position of the animation. When the animation is regenerated, the pointer 5 moves on the reference line 4 from one end to the other end of the reference line 4. The user can move the pointer 5 by dragging the pointer 5 using a mouse, etc. in the arrow direction. Therefore, the animation can be regenerated based on the position of the pointer at the speed of the dragging operation.

Thus, the conventional slider apparatus displays animation on the display 1 by a combination use of the linear reference line 4 and the pointer 5 moving on the line so that desired information can be obtained while visually confirming the ratio of the animation displayed on the animation display 2 to the entire information.

The above described conventional slider apparatus confirms the information according to the position of the pointer 5 moving on the linear reference line 4. Therefore, when the change of displayed information such as animation, etc. does not correspond to a simple line, it is hard to select a desired position. For example, if displayed information is images recorded using a camera on the move, it is necessary to specify the current stage in the entire image to be displayed on the display 1. That is, in this case, the recording position is more important than the recording time. Therefore, in the above described case, the slider apparatus comprising the reference line 4 and the pointer 5 simply moving on the reference line 4 does not satisfactorily work.

SUMMARY OF THE INVENTION

The present invention aims at providing a slider apparatus capable of operating and displaying image information. etc., which cannot be specified by a slider apparatus using a linear reference line, in a visually comprehensible manner using a curved reference line.

That is, the above described problem can be solved according to the first aspect of the present invention by providing a curve slider apparatus having a coordinate display unit for displaying a curve slider formed by a reference line and a pointer moving on the reference line; an operation target display unit for displaying a corresponding operation target object at the position of the pointer moving on the reference line; a conversion table for storing data corresponding to the object to be displayed on the operation target display unit; and a control unit for controlling the movement of the pointer on the reference line interlocking with the regeneration of the object corresponding to the position of the pointer.

The coordinate display unit provides, for example, a reference line on a map and a pointer movable on the reference line, and specifies the position of the pointer using a pointing device such as a mouse, a tablet, etc. The control unit reads coordinate data of the position specified on the reference line according to the data stored in the table, and displays a corresponding object (for example, animation data) on the operation target display unit. In addition, it reads the information about the position of the pointer on the reference line based on the object (for example, animation data) displayed on the operation target display unit, and moves the pointer to the corresponding position.

With the above described configuration, the position of the pointer moving on the reference line can be freely moved to display an object at a desired position (for example, at a position on a map) on the operation target display unit.

Furthermore, the position on the reference line pointed to by the:pointer can be viewed by comparing it with the animation by forming the coordinate display unit and the operation target display unit on the same display, thereby realizing a curve sliver apparatus with high operability and visibility.

In addition, according to the second aspect of the embodiment, the recording operation and the difference in a moving unit can be displayed by changing the color and the form of the reference line.

With the configuration, only by giving a glance at the reference; line displayed on the coordinate display unit, the position of the recording operation and the moving unit of a camera device such as a car, a bicycle, on foot, etc. can be easily recognized.

In addition, the direction of a camera and the moving unit of a user as a cameraman can be displayed by changing the color and the form of the pointer. With the above described configuration, the direction of a camera and the moving unit of the cameraman can be easily recognized only by taking a glance at the pointer displayed on the coordinate display unit.

Furthermore, the present invention does not limit an applicable screen to a two-dimensional screen, but can also be applied to a three-dimensional screen. The operation target display unit can be designed to display not only dynamic object such as animation, etc., but also static objects such as a graph, a table, a text, a photograph, a static image, etc. indicating the temperature, humidity, sound, etc.

BRIEF DESCRIPTION OF THE DRAWINGS

FIG. 5 shows the configuration of the memory in the conversion table according to the first embodiment;

FIG. 11 shows the configuration of the memory of the conversion table according to the second embodiment of the present invention;

FIG. 12 is a flowchart of the data inputting process according to the second embodiment of the present inventions;

FIG. 13 is a flowchart showing the process performed after the input wait state according to the second embodiment of the present invention;

FIG. 16 shows the configuration of the memory of the conversion table according to the third embodiment of the present invention;

FIG. 19 shows the configuration of the memory of the provisional conversion table according to the fourth embodiment of the present invention;

FIG. 20 shows the configuration of the memory of the conversion table according to the fourth embodiment of the present invention;

FIG. 24 shows the state of the display according to the fifth embodiment of the present invention;

FIG. 26 shows an example of the configuration of the memory of the conversion table according to the sixth embodiment of the present invention;

FIG. 28 shows an example of the configuration of the memory of the conversion table according to the seventh embodiment of the present invention;

DESCRIPTION OF THE PREFERRED EMBODIMENT

The embodiments of the present invention are described below in detail by referring to the attached drawings.

Figure 2:
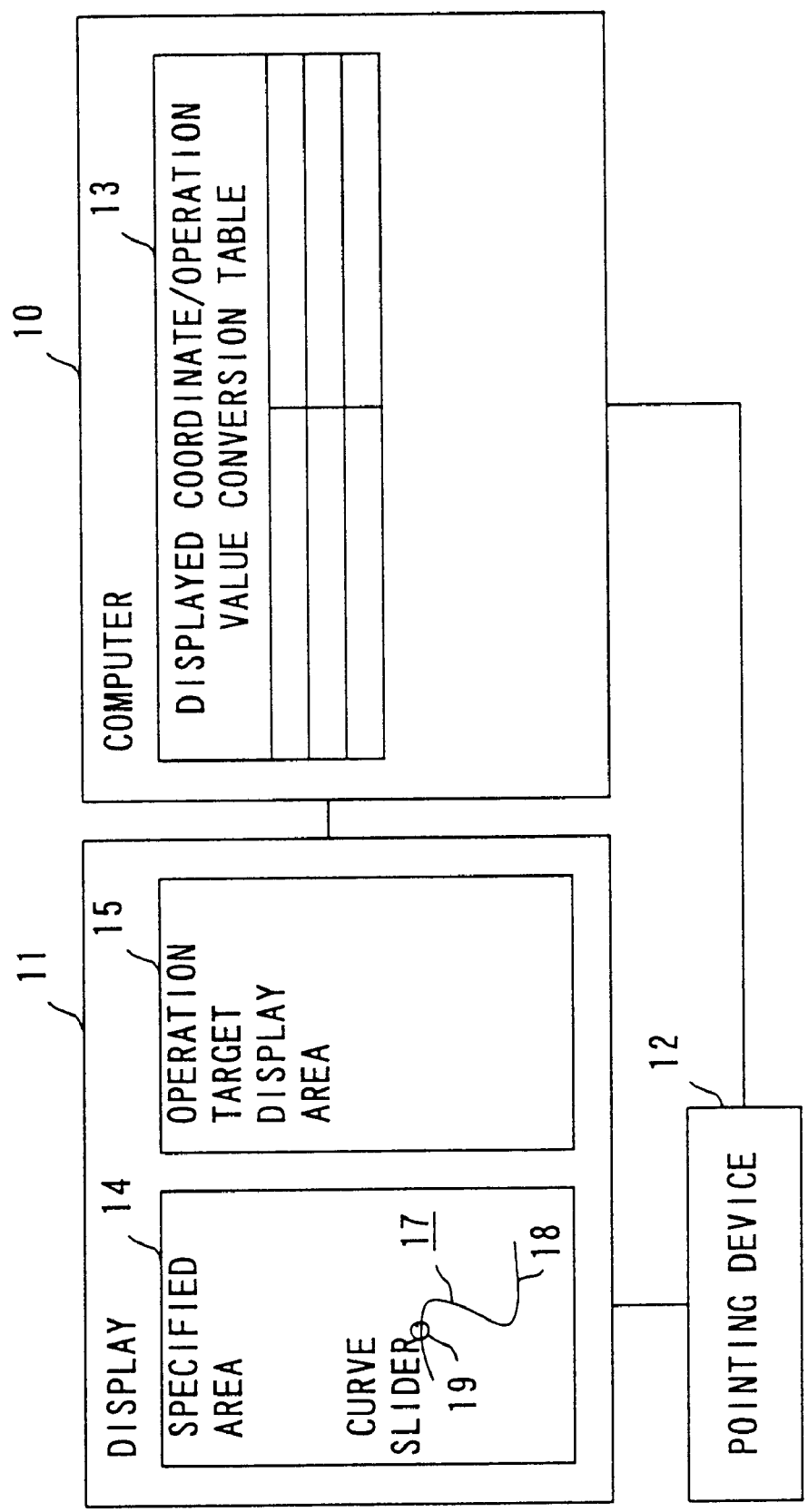
FIG. 2 shows the entire configuration of the system according to the present invention.

FIG. 2 shows the configuration of the entire system of the present invention. In this example, the system comprises a computer 10, a display 11, and a pointing device 12. The display 11 is a display unit of the computer 10. The computer 10 can be a personal computer such as a desktop computer, a notebook, and a computer in a car navigation system provided for a car. The computer 10 comprises a CPU, ROM, and RAM not shown in FIG. 2, and also comprises a display coordinate and operation value conversion table (hereinafter referred to simply as a conversion table) 13. The conversion table 13 shows the correspondence between the coordinates (display coordinates) on the curve slider described later and the value (operation value) input as an operation target.

The display 11 comprises a specified area 14 and an operation target display area 15. The specified area 14 displays a curve slider 17, and the operation target display area 15 displays an operation target such as animation, a graphical image, etc. indicating a change in temperature, humidity, etc.

Figure 3:
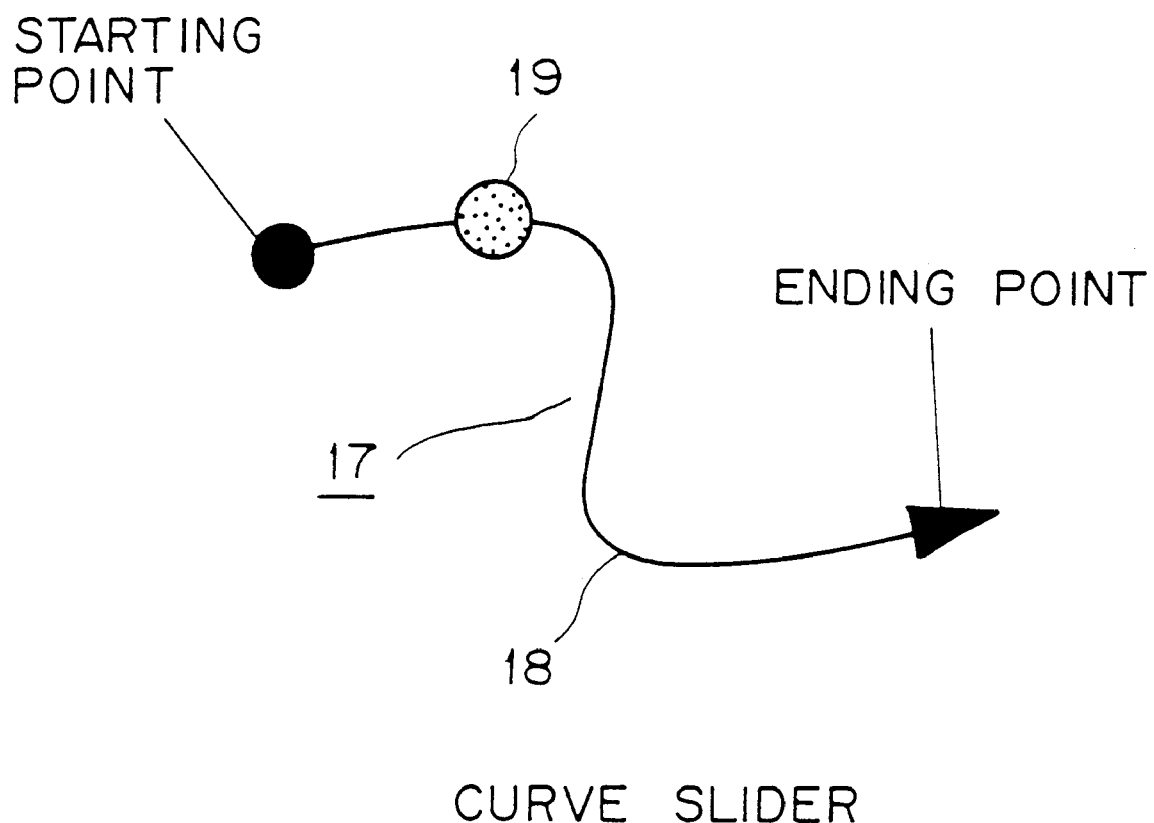
FIG. 3 shows an example of the curve slider displayed on a specified area.

The pointing device 12 comprises, for example, a mouse, a tablet, etc. to specify an optional position on the above described curve slider 17. The curve slider 17 comprises a curved reference line 18 and a pointer 19, and specifies an optional position on the reference line 18. The curve slider 17 is provided at its end with a mark indicating the starting point or the ending point of the reference line 18. In FIG. 3, the left end of the reference line 18 is a starting point, and the right end is an ending point. A black dot indicating a starting point is displayed at the left end of the reference line 18, and an arrow indicating an ending point is displayed at the right end of the reference line 18.

Described below are practical embodiments of the present invention.

<First Embodiment>

Figure 4:
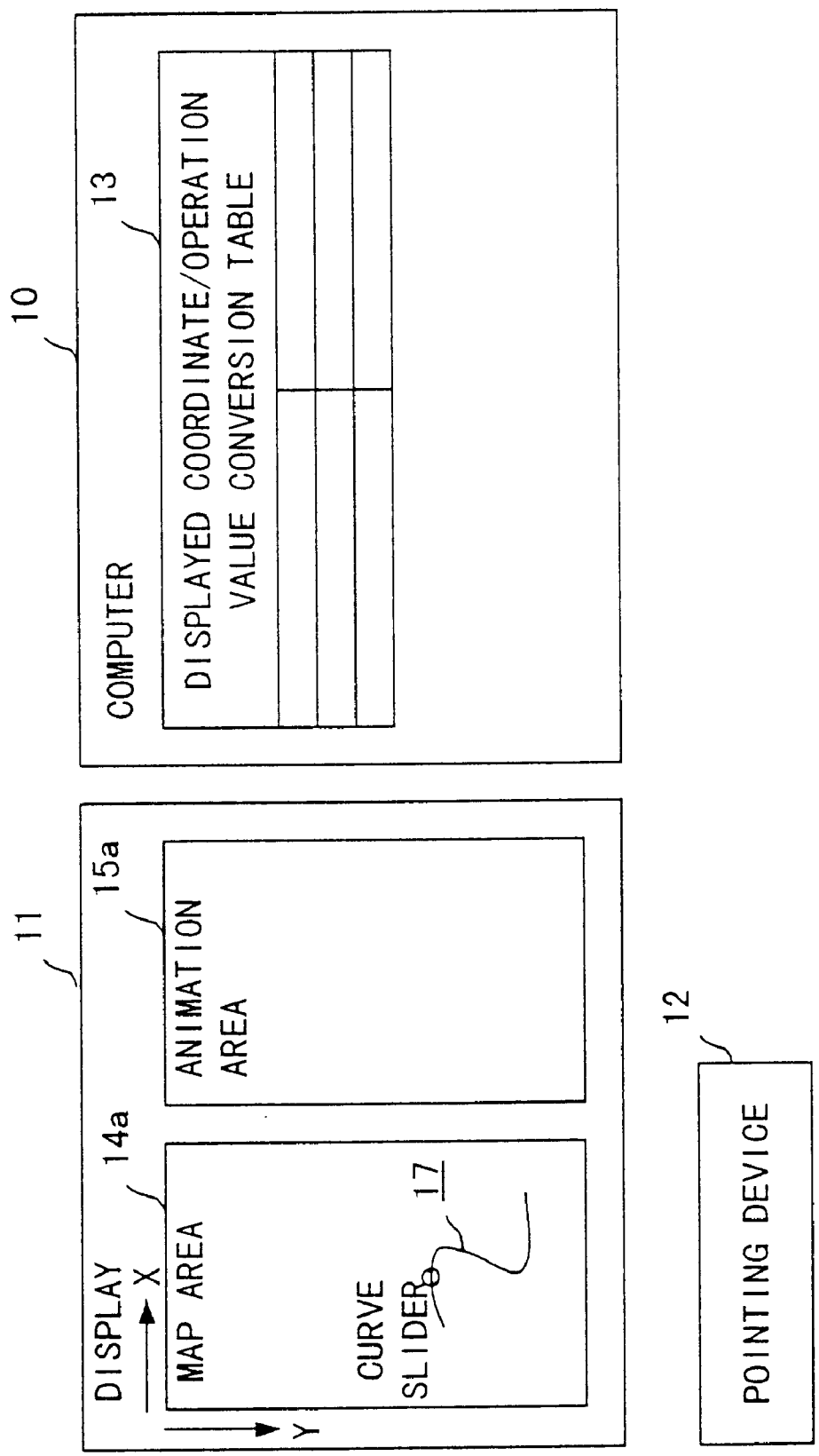
FIG. 4 shows the configuration of the system according to the first embodiment.

FIG. 4 shows the configuration of the system according to the first embodiment of the present invention. According to the embodiment, a curve slider 17 is generated on a map, and the pointer 19 interlocks with animation so that the regeneration point of an image captured from a moving car can be specified. That is, according to the present embodiment, animation, which is a dynamic object, is processed as an operation target.

In the present embodiment, the specified area 14 on the display 11 shown in FIG. 4 is a map area 14a, and the operation target display area 15 is an animation area 15a. The curve slider 17 displayed on the map area 14a indicates the locus of a moving camera on the map.

Figure 6:
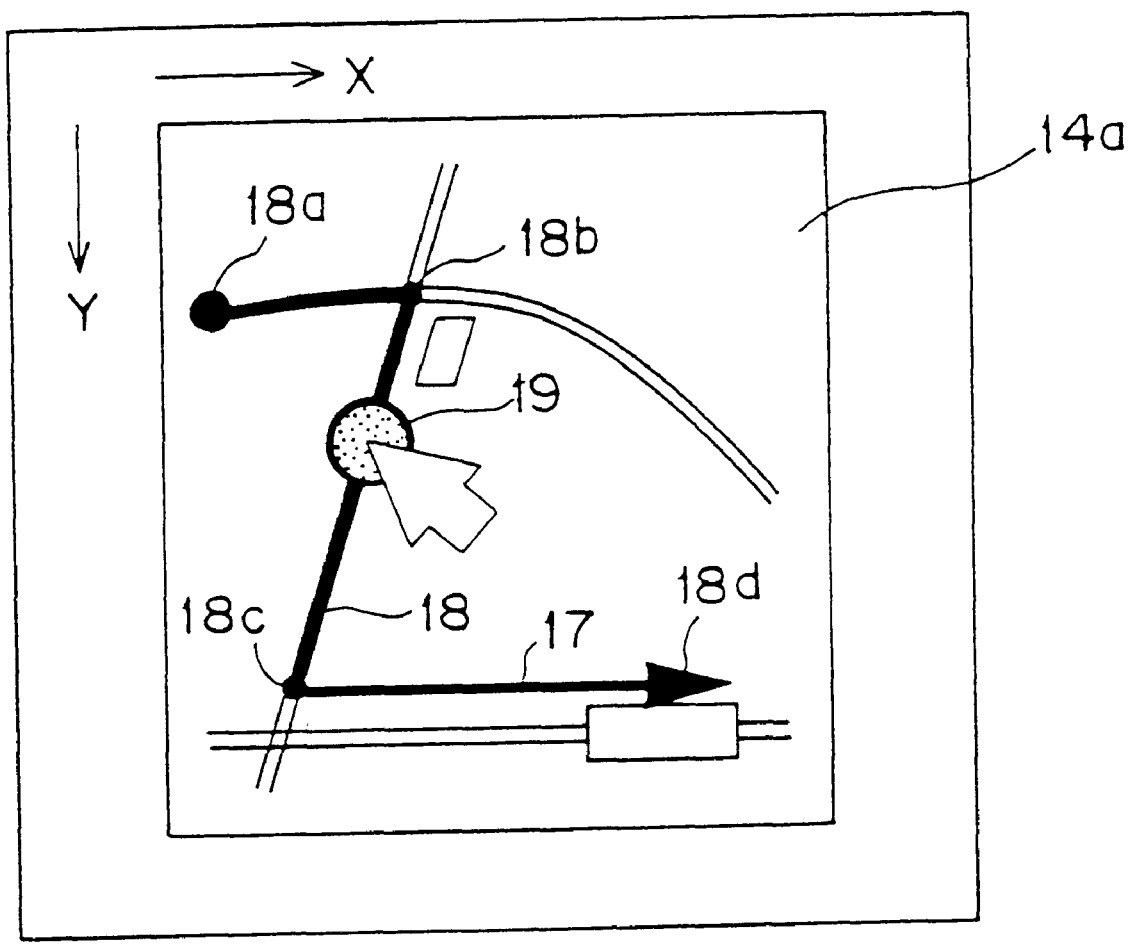
FIG. 6 shows the reference line and the pointer displayed in a map area.

On the other hand, the conversion table 13 in the computer 10 shows the conversion between the coordinates on the map and the shooting time of animation. According to the present embodiment, the map area 14a is a two-dimensional screen, and displays the two-dimensional curve slider 17. As shown in FIG. 4, the horizontal direction in the map area 14a is defined as the X direction (X coordinates), and the direction orthogonal to the horizontal direction is defined as the Y direction (Y coordinates). FIG. 6 is an enlarged view of the map area 14a, and shows in detail the configuration of the reference line 18 displayed on the map area 14a and a pointer 19 positioned on the reference line 18. The starting position of the reference line 18 on the map area 14a is 18a, and the ending position is a 18d. The initial position of the pointer 19 is the starting position 18a of the reference line 18.

Figure 7:
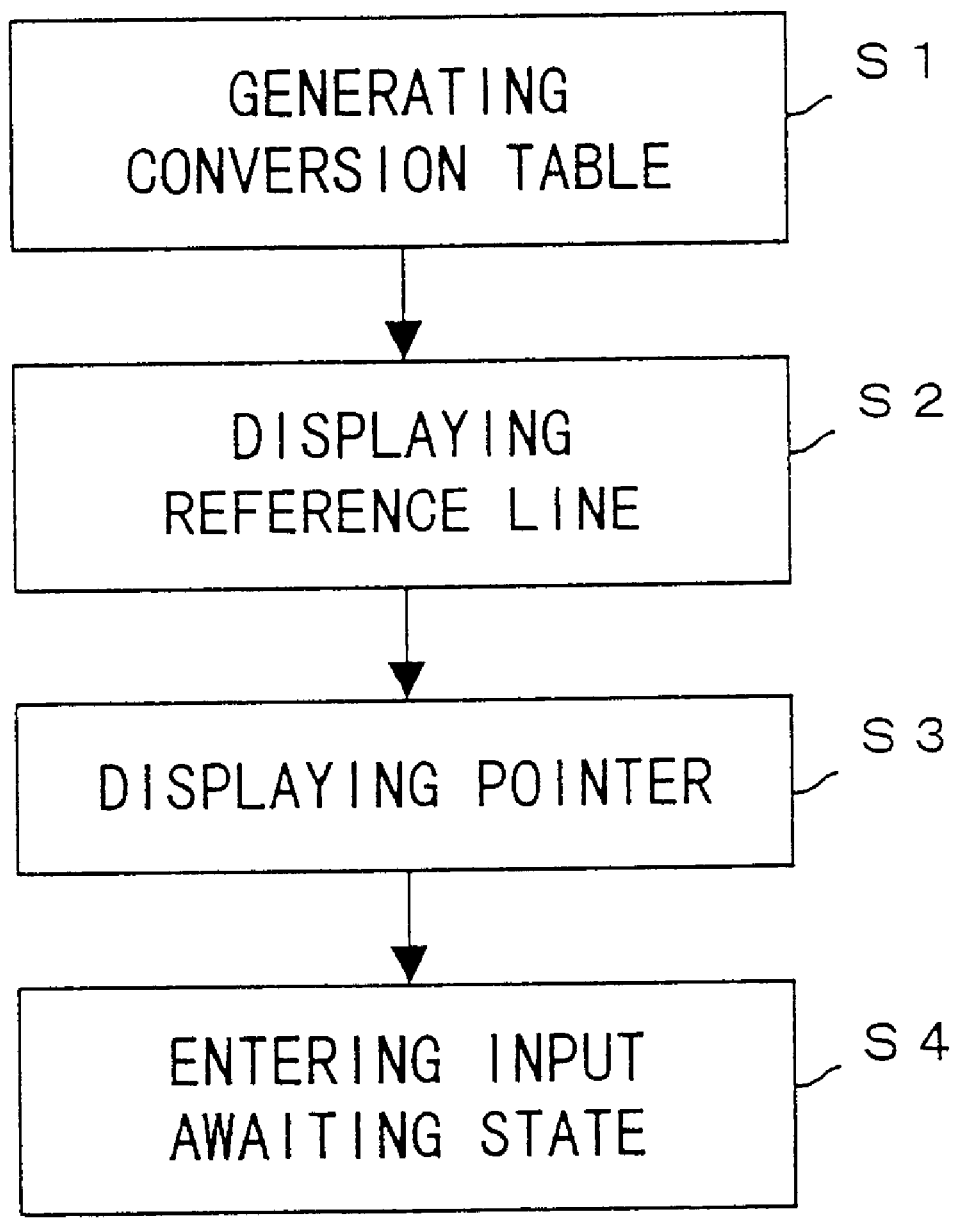
FIG. 7 is a flowchart of the data inputting process according to the first embodiment of the present invention.

The process according to the present embodiment is described below by referring to the flowchart in FIG. 7.

First, the CPU in the computer 10 generates the conversion table 13 (step (hereinafter S for short) 1). The process is performed by moving a camera in the map area 14a using a moving device such as a car, etc., and generating a correspondence table between the coordinate data on the map area 14a and the animation data.

In the example shown in FIG. 5, the conversion table 13 does not store animation data, but stores the data about the animation time corresponding to the animation data. The conversion table 13 can store the coordinate data on the slider corresponding to the data specifying the position of animation data. Therefore, an animation time as the data specifying the position of animation data can be replaced with a counter specifying the position of the animation data. In addition, in the example shown in FIG. 5 the X and Y coordinates are used as the coordinate data on the slider, but they can be one-dimensional coordinate data indicating the distance from the starting point on the slider. This holds true with an example of the conversion table according to other embodiments of the present invention. The computer 10 is provided with memory (not shown in FIG. 5) storing the conversion table 13.

First, the camera is moved to the starting position 18a to start shooting animation. Then, the coordinates (X and Y coordinates) of the starting position on the map are obtained, and the animation time is set. If the X coordinate and the Y coordinate of the starting position 18a are respectively 120 and 70, then the data of the above described X coordinate and Y coordinate is written to the first storage line (storage area) of the conversion table 13. When the recording operation starts, the animation time at the starting position is 0, and 0 is written to the storage area of the animation time.

Then, the camera continues shooting animation. For example, if the coordinates to be stored refer to the position 18b shown in FIG. 6, then the coordinate data corresponding to the position 18b is written to the next storage line (storage area) of the conversion table 13. In the above described example, In the above described example, for example, 150 is written as the X coordinate, and 64 is written as the Y coordinate. In addition, for example, '01:20' is written as a corresponding animation time.

The camera furthermore continues shooting the animation. If the next coordinates refer to a position 18c shown in FIG. 6, then the coordinate data of the X coordinate corresponding to the position 18c, for example, 128, is written to the next storage line of the conversion table 13, and, for example, 145 is written as the coordinate data of the Y coordinate. In addition, '04:25' is written as a corresponding animation time. Then, the coordinate data (X coordinate 166 and Y coordinate 147) of the end-of-shooting point is finally written, and '08:54' is written as a corresponding end-of-animation time. During the above described process, the correspondence information about the animation time and the animation data is stored in the memory not shown in the attached drawings.

Figure 8:
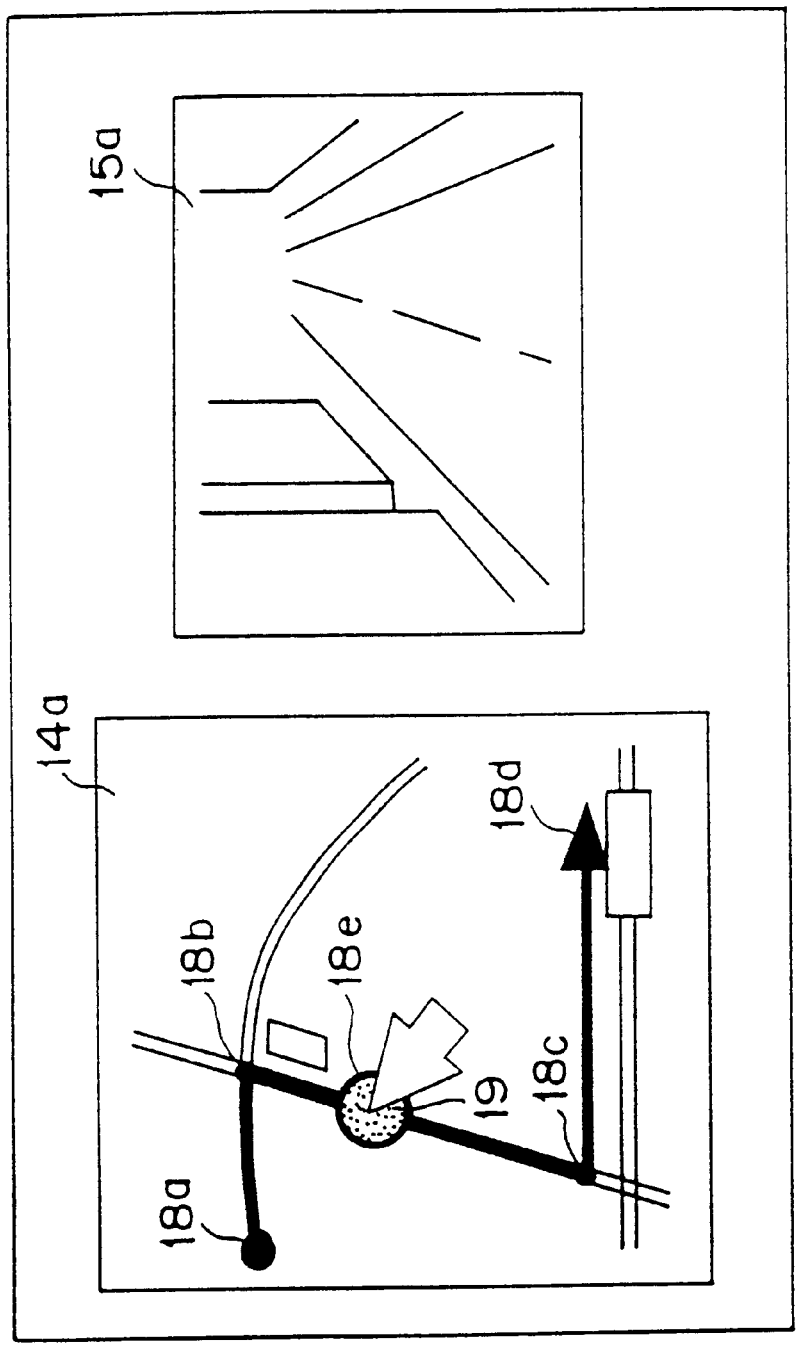
FIG. 8 shows the state of the display according to the first embodiment of the present invention.

If the conversion table 13 is completed as described above, then the process of displaying a reference line is performed (S2). The process of displaying the reference line 18 is performed by displaying the reference line 18 on the map area 14a according to the conversion table 13. Practically, the reference line 18 is displayed on the map area 14a according to the coordinate data written to the X and Y coordinates of the conversion table 13. FIG. 8 shows the state of displaying the reference line 18 on the map area 14a in the displaying process. The coordinate positions 18a through 18d on the screen are sequentially connected. That is, the starting position 18a is connected to the next position 18b. The position 18b is connected to the next position 18c. Then, the position 18c is connected to the ending position 18d.

Next, the pointer 19 is displayed (S3). The pointer 19 is displayed at the initial starting position 18a. When the pointer 19 is specified by operating a mouse, etc., the pointer 19 is displayed at a corresponding position according to the above described conversion table 13. Then, data input from the user is waited (S4).

Figure 9:
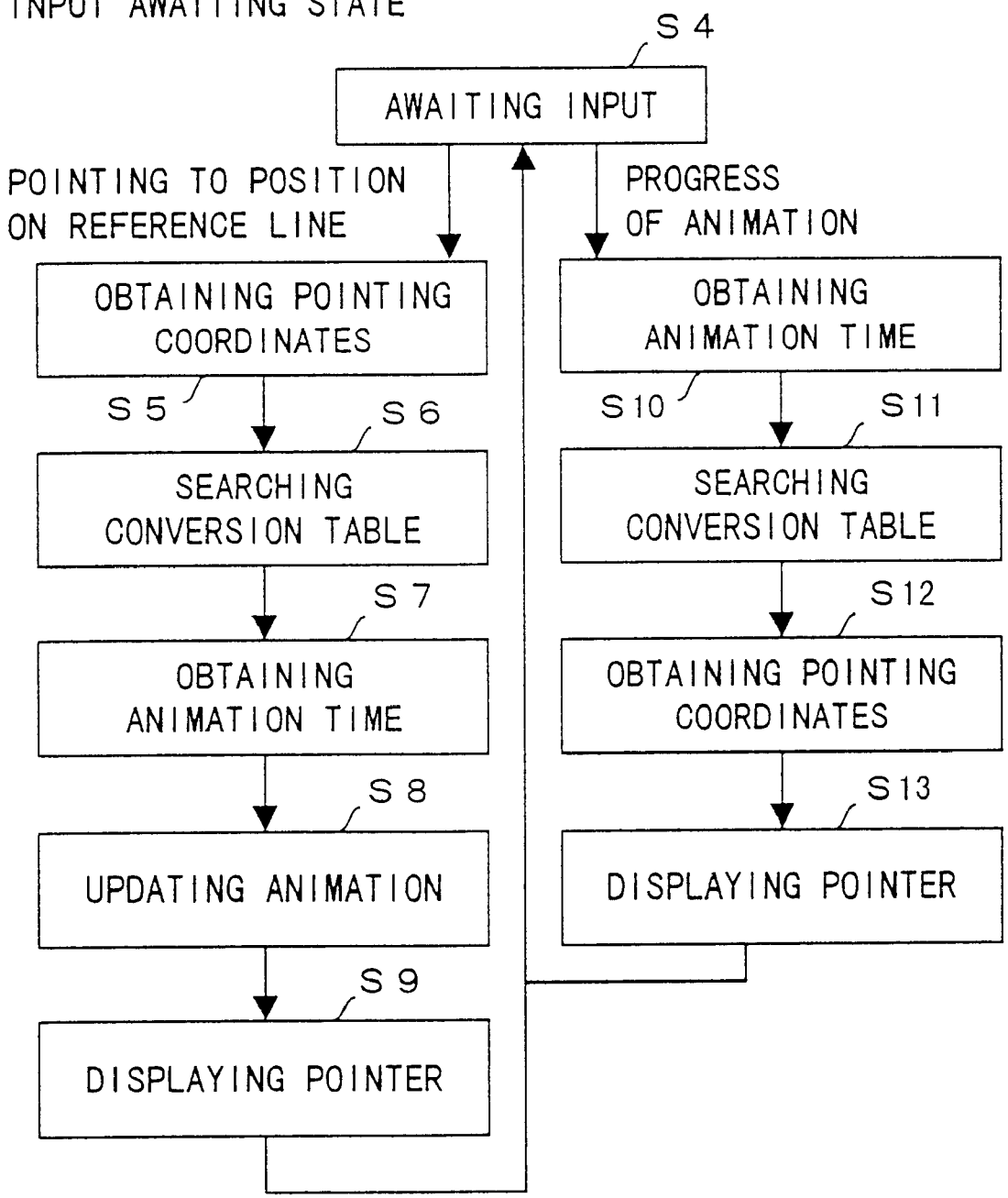
FIG. 9 is a flowchart showing the process performed after the input wait state according to the first embodiment of the present invention.

On the other hand, FIG. 9 is a flowchart of the process performed after the input wait state is entered. In the; process performed after the input wait state is entered, either the user specifies the pointer 19 on the curve slider 17 (reference line 18) using the pointing device 12 such as a mouse, etc., or the pointer 19 is moved on the reference line 18 with the movement of the animation.

Described below is the case in which the user specifies the pointer 19 on the reference line 18 using the pointing device 12. In this case, the pointer 19 is moved by operating the pointing device 12 such as a mouse, etc. in the above described input wait (S4) state. For example, in the above described example, the pointer 19 positioned at the starting position 18a is moved to a position 18e shown in FIG. 7. At this time, the CPU obtains (obtains the pointed coordinates) the coordinate data of the specified pointer 19 (S5), and the conversion table 13 is searched (S6).

For example, the position of the pointer 19 is between the above described positions 18b and 18c. The data of an animation time is obtained from the coordinate data of the pointer 19 and the coordinate data of the positions 18b and 18c (S7). For example, if the coordinate data of the position 18e is (142, 100), then the position 18e specifies the position at 4/9 between the position 18b and the position 18c. Therefore, about the animation time, 4/9 of the time obtained by subtracting '01:20' from '04:25' can be obtained. In this case, '02:42' is obtained as an animation time. That is, according to the present embodiment, for example, corresponding animation data (shot data) is read from the memory not shown in the attached drawings, and the data of the time '03:03' is displayed on the animation area 15a (S8). In addition, the pointer 19 is displayed on the corresponding reference line 18 (S9).

On the other hand, when the pointer 19 is specified as another position, the computation similar to that described above is performed to display the corresponding animation on the animation area 15a. If the specified position of the pointer 19 is the coordinate position written to the conversion table 13, for example, 18b, 18c, and 18d, then the shot image at the corresponding animation time is displayed.

By performing the above described process, the animation at a corresponding position can be displayed on the animation area 15a only by moving the pointer 19 to an optional position on the reference line 18 formed on a map, thereby easily obtaining the correspondence between the position on the map and the animation.

Described below is the case in which the pointer 19 on the reference line 18 is moved with the movement of the animation. In this case, an animation time is obtained with the progress of the animation from the above described input wait (S4) state (S10). Next, the conversion table 13 is searched according to the obtained animation time data (S11), and the coordinates of the point corresponding to the animation position are obtained (S12). For example, when the animation time of '01:20' is obtained, the corresponding coordinates are the X coordinate of 150 and the Y coordinate of 64. When the animation time of '04:25' is obtained, the corresponding coordinates are the X coordinate of 128 and the Y coordinate of 145. The coordinates of the corresponding point are obtained from the conversion table 13 (S12).

Finally, the pointer 19 is moved to the corresponding position on the reference line 18 (S13). For example, at the animation time of 01:20, the pointer 19 is moved to the position 18b for display. At the animation time of 04:25, the pointer 19 is moved to the position 18c for display.

On the other hand, in the above described example, the animation time is shown in the conversion table 13. If the animation time is not shown in the conversion table 13, the following process is performed. For example, when the animation time is '02:42' not shown in the conversion table 13, it is the time between the animation times of the positions 18b and 18c, a linear approximation is performed, the difference between the animation times (01:20 and 04:25) of the positions 18b and 18c is obtained, and the coordinate data is obtained from the proportional distribution. In this case, the above described computation is inversely performed to obtain the coordinate data (142, 100), and the pointer 19 is displayed at the corresponding position on the reference line 18.

In the above described process, the position of the displayed animation on the map can be automatically indicated on the reference line 18, thereby easily obtaining the position of the displayed animation on the map.

As described above, according to the present embodiment, the position and route on the map can easily correspond to the animation, thereby improving the efficiency of an operation.

<Second Embodiment>

Described below is the second embodiment of the present invention.

The operation target according to the above described first embodiment is animation as a dynamic object. However, according to the present and the third embodiments, the operation targets are static objects such as a graph, table, text, photo, static image, etc. According to the present embodiment, a graph is used as a static object to be processed, and the sound of, for example, voice, noise, etc. is displayed as a graph.

That is, according to the present embodiment, a change in sound, level of voice, noise, etc. is expressed in a graph as a static object to be processed. According to the third embodiment, a change in temperature and humidity is expressed in a graph to be processed. Practical explanation is given below.

Figure 1:
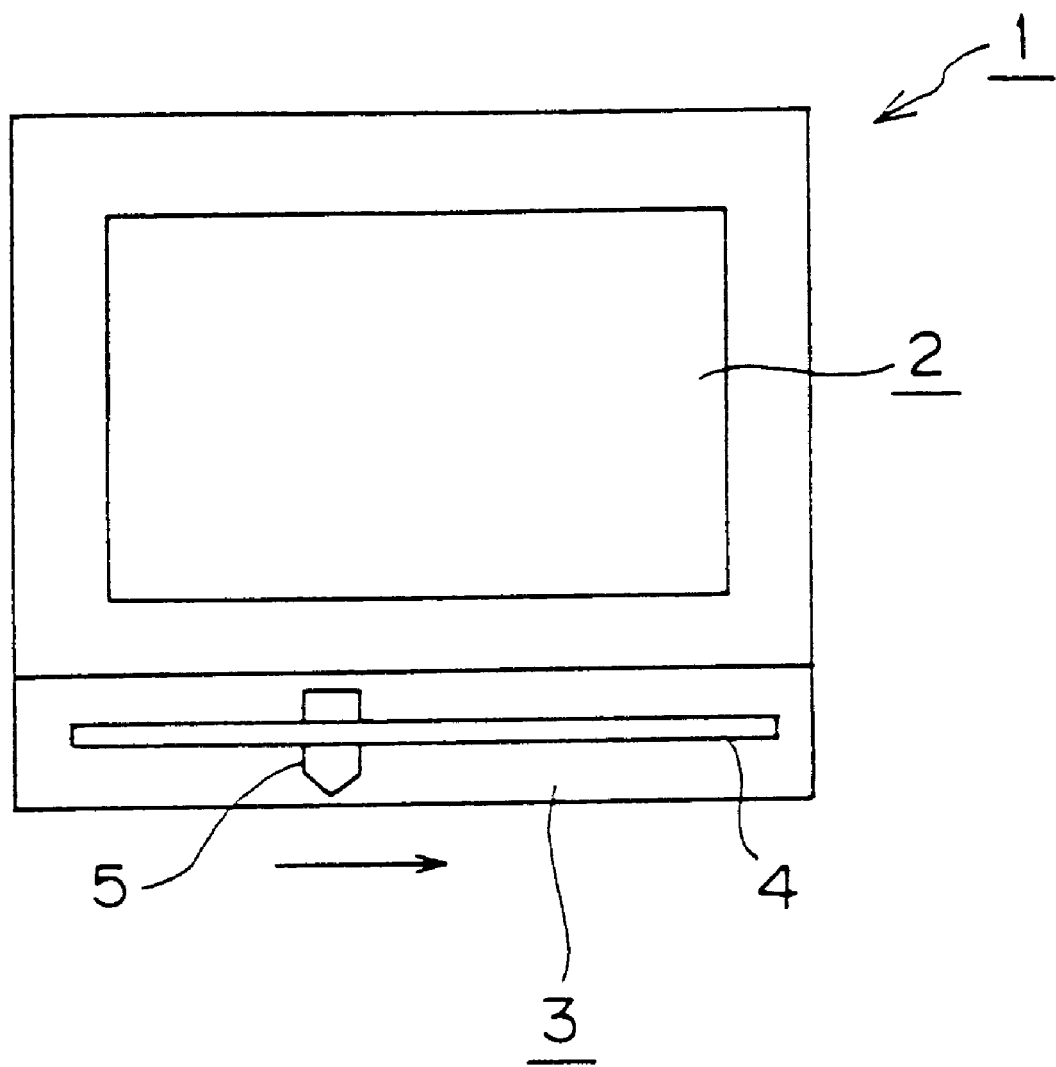
FIG. 1 shows a slider apparatus.
Figure 10:
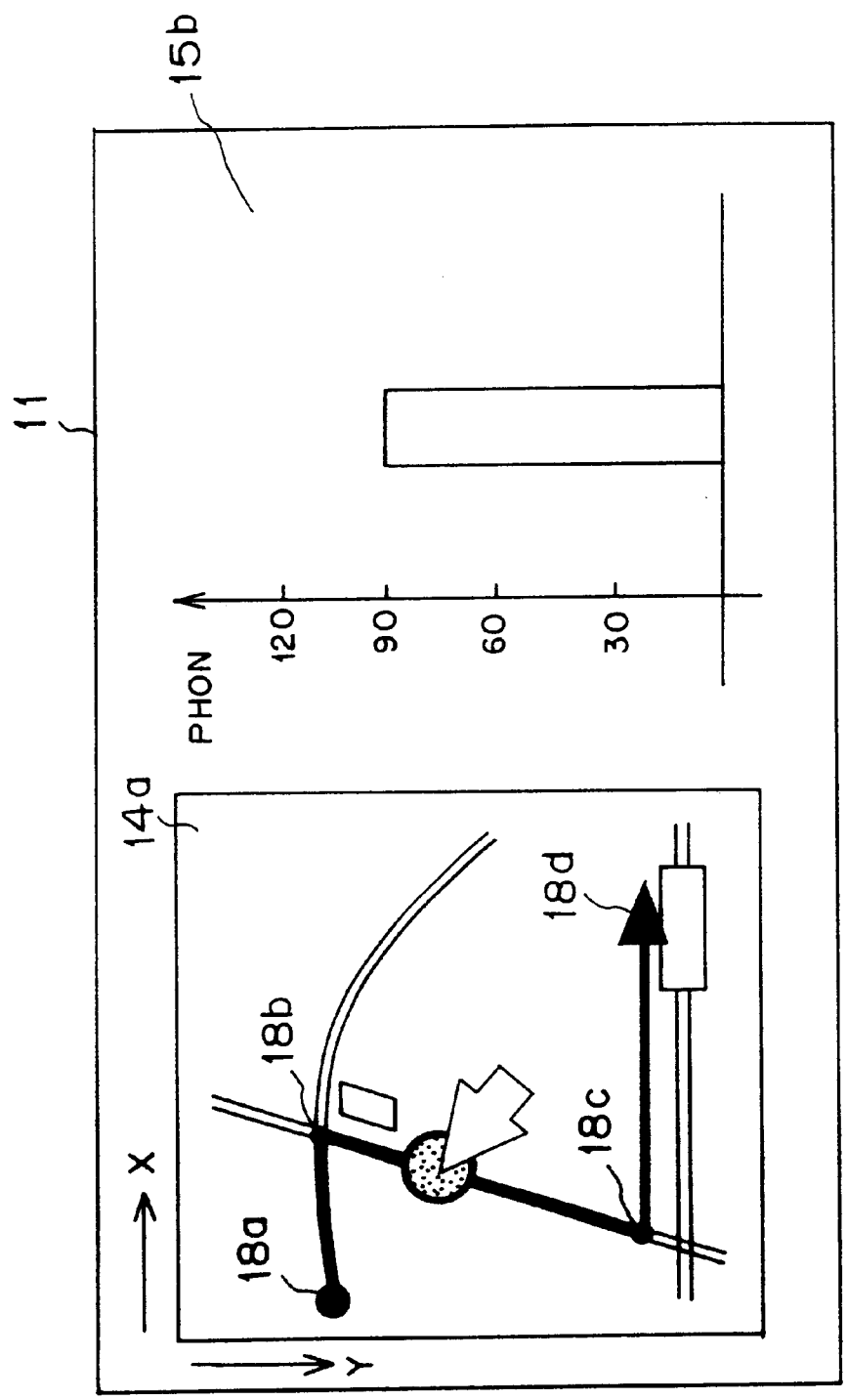
FIG. 10 shows the second embodiment of the present invention.

FIG. 10 shows the display screen according to the second embodiment of the present invention. In the present embodiment, the configuration of the system shown in FIG. 1 is also used, that is, the system comprises the computer 10, the display 11, and the pointing device 12. The display 11 is, for example, a display unit of the computer 10, and is expressed as shown in FIG. 10. That is, the display 11 comprises the specified area 14 and the operation target display area 15. The specified area 14 is the map area 14a according to the present embodiment. The curve slider 17 displayed on the map area 14a indicates the locus on the map.

A level display 15b is given in the operation target display area 15. The level display indicates the noise level at the position of the pointer, and the level is expressed by, for example, phon.

On the other hand, the conversion table 13 of the computer 10 shows the noise level at the position corresponding to the coordinates on the map. FIG. 11 shows a practical example of a conversion table 20 used in the present embodiment. Also in the present embodiment, the two-dimensional curve slider 17 is displayed on the map area 14a. As shown in FIG. 10, the horizontal direction in the map area 14a is defined as the X direction (X coordinates), and the direction orthogonal to the horizontal direction is defined as the Y direction (Y coordinates).

The configurations of the reference line 18 displayed on the; map area 14a and the pointer 19 positioned on the reference line 18 are the same as those according to the above described first embodiment. The starting point of the reference line 18 is the starting position 18a, and the ending point of the reference line 18 is the ending position 18d.

The process according to the present embodiment is described below by referring to the flowchart shown in FIG. 12.

According to the present embodiment, the conversion table 20 is first generated (step (hereinafter expressed as ST) 1). The conversion table 20 shows the position information about the reference line 18 in comparison with the noise level expressed by the level display 15b. When the conversion table 20 is generated, the noise is preliminarily measured and recorded by a noise measure along the reference line 18 on the map.

Practically, the noise at the starting position 18a is measured, and the measured level is recorded in the conversion table 20. That is, the X coordinate and the Y coordinate of the starting position 18a are respectively set as 120 and 70. The above described X and Y coordinate data, and the above described noise level are written to the first storage line (storage area) of the conversion table 20. If the noise level at the starting position 18a is 40 phon, then the value '40' is written to the area of the noise level in the conversion table 20.

Then, the measurement of the noise level is continued. For example, at the position 18b shown in FIG. 10, 150 is written as the X coordinate, 64 is written as the Y coordinate, and 90 phon is recorded as a noise level. In addition, at the position 18c, 128 and 145 are written respectively as the X and Y coordinates, and 100 phon is recorded as a noise level.

Similarly, the noise level on the reference line 18 is written with the data of the coordinate position, and finally the X coordinate of 166 and the Y coordinate of 147 are written as the coordinate data of the ending position 18d, and the noise level (for example, 60 phon) is recorded.

When the conversion table 20 is completed as described above, the reference line 18 is displayed (ST2). In the process of displaying the reference line, the reference line 18 is formed on the map area 14a based on the conversion table 20 generated as described above. That is, the reference line 18 is formed on the map area 14a according to the coordinate data recorded in the X and Y coordinate columns in the conversion table 20.

Then, the pointer 19 is displayed (ST3). It is displayed as described above, that is, the pointer 19 is displayed on the starting position 18a as the initial value. When the pointer is specified, the pointer 19 id displayed at the corresponding position based on the conversion table 20. Then, the data input from the user is waited for (ST4).

After the conversion table 20 has been completed, the user specifies the pointer 19 on the curve slider 17 (reference line 18) using a mouse, etc. For example, when a noise level at an intersection is to be obtained, the:user operates a mouse to move the pointer 19 to the position 18b. The process performed in this case is based on the flowchart shown in FIG. 13. That is, the coordinate data about the specified pointer 19 is first obtained (ST5), the conversion table 20 is searched (ST6), the data of the noise level '90' is read (ST7), and is displayed on the level display 15b of the noise (ST8). In the above described process, for example, the nose level (90 phon) at the position 18b (intersection) is displayed on the level display 15b.

When the noise level at the position 18c, which is another intersection, is to be obtained, the mouse is operated to move the pointer 19 to the position 18c so that the conversion table 20 can be searched, and the noise level '100' can be displayed on the level display 15b of the noise.

Also when the noise level at a position other than an intersection is to be obtained, the mouse is operated to move the pointer 19 to a desired position. Thus, the noise level can be easily displayed. In this case, the noise level is measured at predetermined intervals of distance along a moving path, and is stored with the coordinate data as a series of noise level data.

At a location where the noise level frequently changes, it is necessary to frequently collect data from the conversion table. On the other hand, at a location where the noise level little changes, the amount of data to be collected from the conversion table can be reduced. . In this case, the noise data in the data in the conversion table can be obtained by generating an approximate linear line or an approximate curved line from the data in the conversion table, and by obtaining the proportional distribution on the approximate linear line, etc.

On the other, hand, the conversion table 20 can be inversely utilized to know the position of the corresponding voice level from the information about the noise level. In this case, the pointer 19 can be moved to the position of the noise level and by specifying the noise level, thereby displaying the position of the corresponding noise level. In this case, for example, by switching graphs at predetermined intervals, the pointer 19 on the slider can be moved. If a static object to be processed is not a graph, that is, if it is a table, text, photo, static image, etc., then the pointer 19 can be moved on the slider by switching the tables, text, photo, etc. at predetermined intervals.

When there are a plurality of positions at the same noise level, a plurality of corresponding positions can be specified by the pointer 19.

As described above, the correspondence between the position on a map and the noise level of the position (around the position) can be easily obtained according to the present embodiment, thereby improving the efficiency of an operation when a countermeasure against noise pollution is taken.

In addition, according to the above described embodiment, the correspondence between the map coordinates and the noise level is recorded in the conversion table 20, but the map coordinates and the time can be recorded as in the first embodiment to read the noise level stored from the time information into another memory.

According to the above described embodiment, the noise level is explained. However, the noise level and the above; described animation can be simultaneously processed. In this case, the noise level can be displayed at the end of the animation screen.

Furthermore, a target sound is not limited to a noise level, but voice, bird chirp, etc. can be processed.

Figure 14:
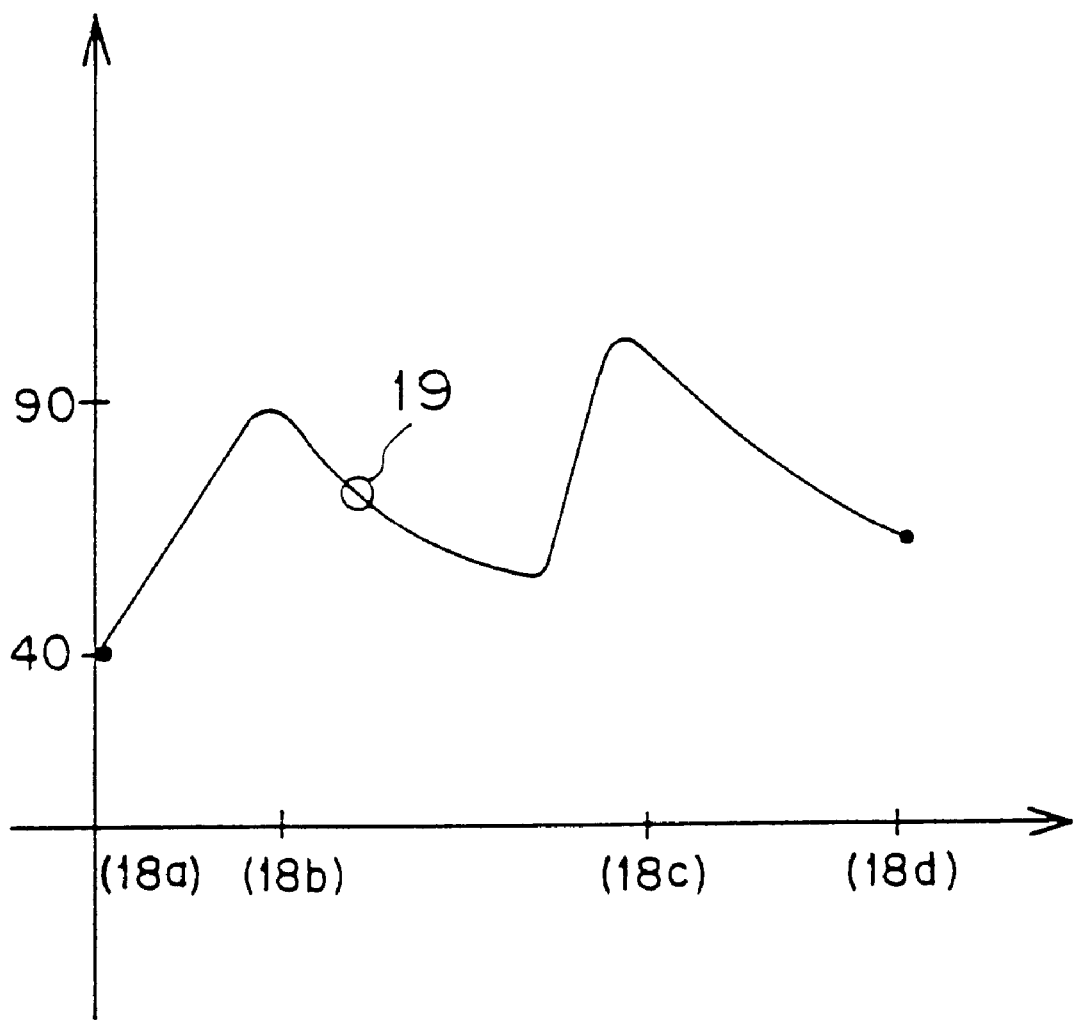
FIG. 14 shows a variation of the second embodiment of the present invention.

The noise level displayed on the level display 15b of noise can be displayed as a continuous curve as shown in FIG. 14.

With the display, a change in noise level along the route of the reference line 18 can be sensitively obtained. In this case, the position on the curve corresponding to the pointer 19 refers to the noise level.

Furthermore, in the above described embodiment, a change in noise level is expressed by a graph, and the graph (change in graph) has been processed. In the present embodiment, a table, text, photo, static image, etc. can also be processed. In this case, a table and text are displayed on the operation target display area 15, or a photo or a static image can be displayed.

<Third Embodiment>

Described below is the third embodiment of the present invention.

The present embodiment is different from the second embodiment in that the operation targets are the temperature and the humidity. That is, the operation target is not animation or noise (sound), but the temperature and humidity, and the temperature and humidity levels at the position of the pointer 19 moving on the reference line 18 are displayed.

Therefore, the present embodiment is also described as an embodiment for static objects to be processed. Described below are practical examples.

Figure 15:
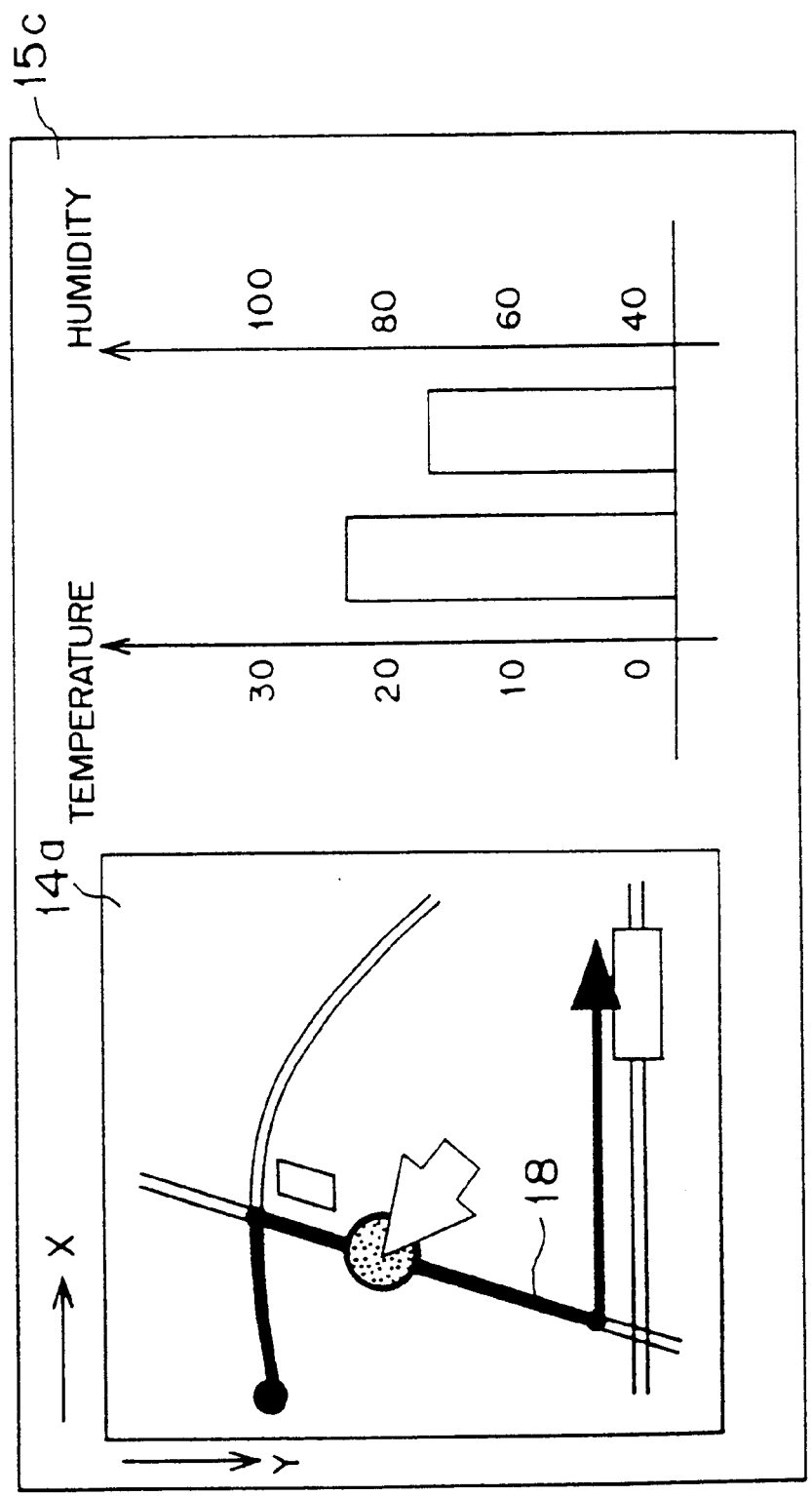
FIG. 15 shows the third embodiment of the present invention.

FIG. 15 shows the third embodiment of the present invention. The present embodiment also comprises, as shown in the system configuration in FIG. 1, the computer 10, the display 11, and the pointing device 12. The display 11 is, for example, a display unit of the computer 10. That is, the display 11 comprises the specified area 14 and the operation target display area 15. The specified area 14 is the map area 14a according to the present embodiment.

The operation target display area 15 is a temperature and humidity level display 15c according to the present embodiment. The level display shows the level of the temperature and humidity at the position of the pointer. The temperature is expressed by ° C., and the humidity is expressed by %.

On the other hand, conversion table 21 shows the coordinate position on a map, and the temperature and humidity at the position. FIG. 16 show a practical example of the conversion table 21. According to the present embodiment, a two-dimensional curve slider is displayed in the map area 14a. As shown in FIG. 15, the horizontal direction in the map area 14a is defined as the X direction (X coordinates), and the direction orthogonal to the horizontal direction is defined as the Y direction (Y coordinates).

Figure 17:
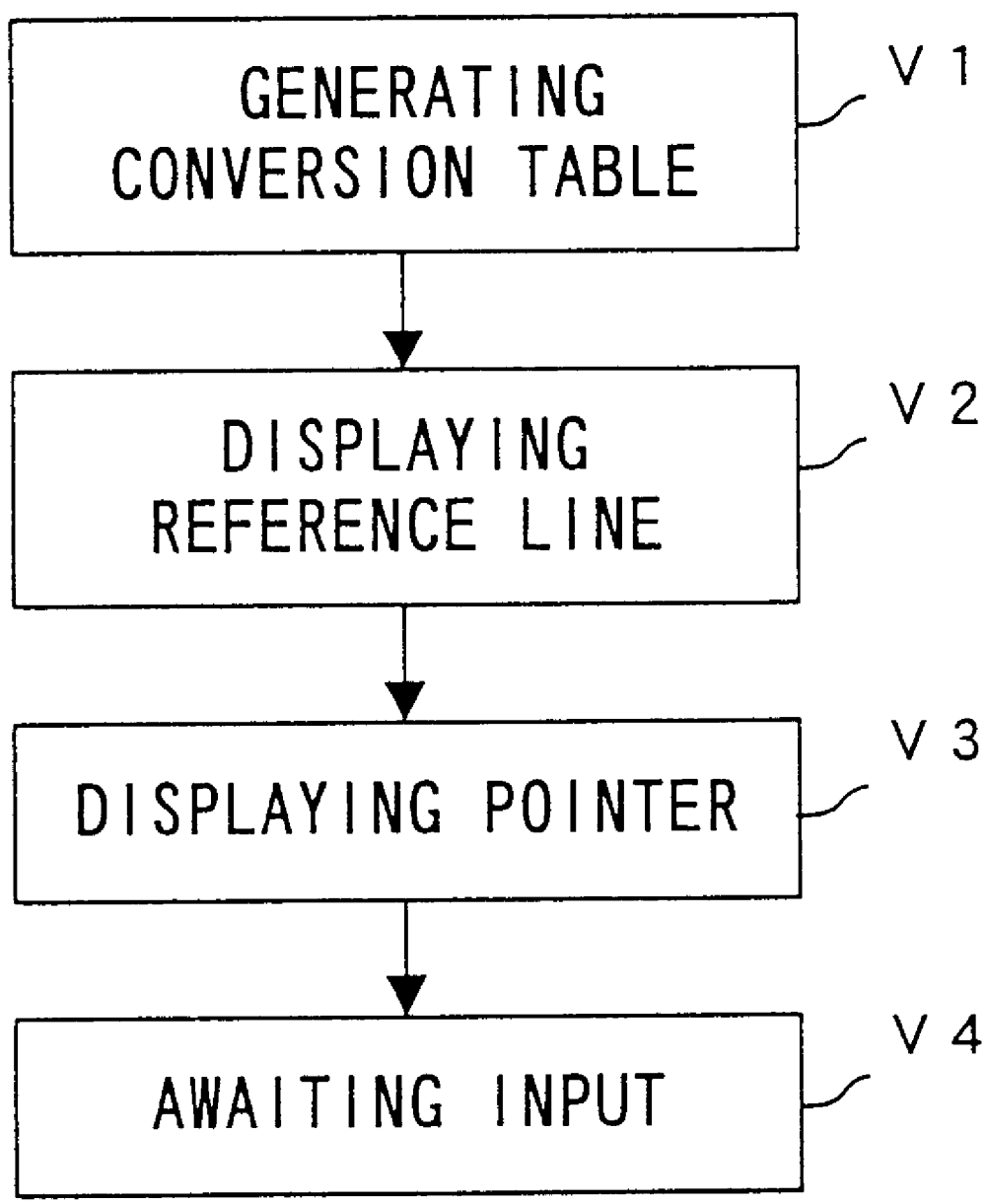
FIG. 17 is a flowchart of the data inputting process according to the third embodiment of the present invention.

The process performed according to the present embodiment is described by referring to the flowchart shown in FIG. 17.

According to the present embodiment, the conversion table 21 is first generated (step (hereinafter expressed by V) 1). This process is performed to generate a table for showing the position information about the reference line 18 shown in FIG. 15 in comparison: with the level displayed on the temperature and humidity level display 15c. The conversion table 21 is generated by, for example, preliminarily measuring and recording the temperature and humidity using a thermometer and a hygrometer along the reference line 18 on a map.

That is, the temperature and the humidity are measured at the starting position 18a, and the measurement result is stored in the conversion table 21. Therefore, the X coordinate (120) and the Y coordinate (70) of the starting position 18a, the temperature and humidity data (for example, 12.4° C., 63% humidity) are first stored as a measurement result. Similarly, the X coordinate (150) and the Y coordinate (64) of the starting position 18b, the temperature and humidity data (for example, 24.2° C., 50% humidity) are stored. The X coordinate (132) and the Y coordinate (145) of the starting position 18*c*, the temperature and humidity data (for example, 24.8° C., 48% humidity) are stored. Finally, the X coordinate (166) and the Y coordinate (147) of the starting position 18*d*, the temperature and humidity data (for example, 22.5° C., 70% humidity) are stored.

When the conversion table 21 is completed as described above, the reference line 18 is displayed (V2). The reference line is displayed on the map area 14*a* according to the generated table described above. The temperature and the humidity can be measured and stored at other positions on the reference line 18, or at predetermined intervals.

Next, the pointer 19 is displayed (V3). The pointer 19 can also be displayed at the starting position 18*a*. Then, the data input state from the user is entered (V4).

After the conversion table 21 has been generated as described above, the user specifies the pointer 19 on the curve slider 17 (reference line 18) using the pointing device 12. For example, when the temperature and the humidity at the position 18*b* are to be obtained, the user operates a mouse to move the pointer 19 to the position 18*b*. In this case, the coordinate data of the specified pointer 19 is first obtained, the conversion table 21 is searched, the corresponding temperature and humidity data is read, and the read data is displayed in the temperature and humidity level display 15*c*. In this process, the temperature of 23.4° C. and the humidity of 63% are displayed as the level display in the temperature and humidity level display 15*c*.

On the other hand, when the temperature and the humidity at another position (for example, position 18*c*) are to be obtained, the mouse is operated to move the pointer 19 to the position 18*c*, the conversion table 21 is searched, and the temperature of 24.2° C. and the humidity of 50% are displayed as the level display in the temperature and humidity level display 15*c*

When the temperature and the humidity at a further position are to be obtained, the mouse is operated to move the pointer 19 to a desired position so that the level of the temperature and the humidity at a desired position can be easily displayed. In this case, for example, the temperature and humidity data is measured at predetermined intervals along a movement route, and is stored as a series of temperature and humidity data together with coordinate data.

At a position where the temperature and the humidity often changes, it is necessary to frequently collect data from the conversion table. On the other hand, at a location where the temperature and the humidity little change, the amount of data to be collected from the conversion table can be reduced. . . In this case, the temperature and humidity data in the data in the conversion table can be obtained by generating an approximate linear line or an approximate curved line from the data in the conversion table, and by obtaining the proportional distribution on the approximate linear line, etc.

On the other hand, according to the present embodiment, the position of the corresponding temperature and the humidity can be displayed from the information about the temperature and the humidity. In this case, the conversion table 21 can be inversely searched by specifying the temperature and humidity level to be obtained to move the pointer 19 to the position of the temperature and the humidity. In this case, for example, by switching graphs at predetermined intervals, the pointer 19 on the slider can be moved. If a static object to be processed is not a graph, that is, if it is a table, text, photo, static image, etc., then the pointer 19 can be moved on the slider by switching the tables, text, photo, etc. at predetermined intervals.

As described above, according to the present embodiment, the correspondence between the position on a map and the temperature and humidity level at the position can be easily obtained, thereby improving the efficiency of operations in the search of a change in environment.

In the example shown in FIG. 15, a very short distance on a map is displayed. However, the present embodiment is more effective when the reference line 18 is displayed as the reference line on a map of a prefecture and other local units, or a map containing a plurality of countries.

Furthermore, in the above described embodiment, a change in noise level is expressed by a graph, and the graph (change in graph) has been processed. In the present embodiment, a table, text, photo, static image, etc. can also be processed. In this case, a table and text are displayed on the operation target display area 15, or a photo or a static image can be displayed.

<Fourth Embodiment>

According to the present embodiment, coordinates are interpolated into the reference line used in the first through third embodiments so that smooth reference lines can be obtained. Also in the present embodiment, the system configuration is designed as shown in FIG. 2, and comprises the computer 10, the display 11, and the pointing device 12. The display 11 is, for example, a display unit of the computer 10.

Figure 18:
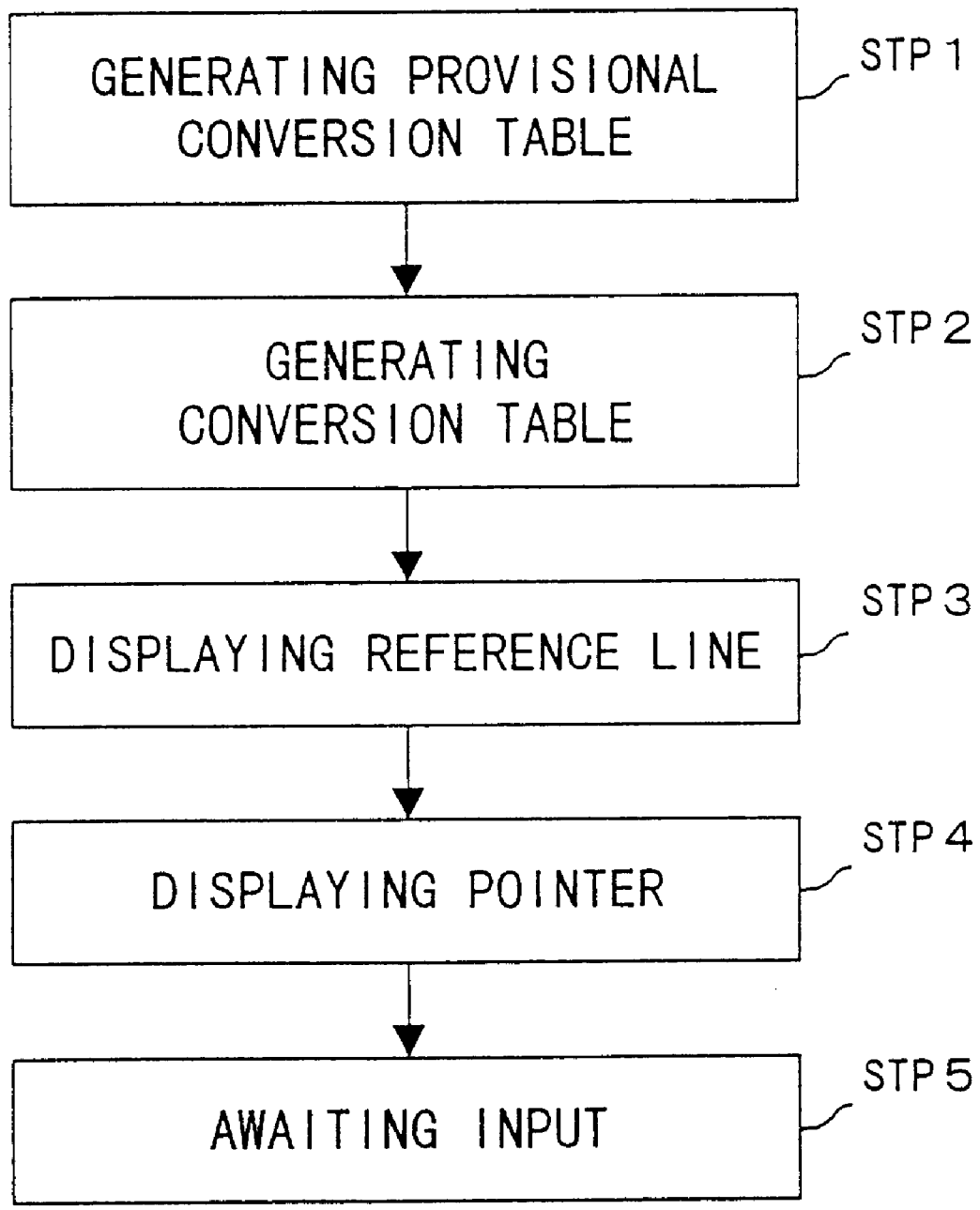
FIG. 18 is a flowchart of the data inputting process according to the fourth embodiment of the present invention.

The process performed according to the present embodiment is described below by referring to the flowchart shown in FIG. 18.

According to the present embodiment, the provisional display coordinate and operation value conversion table 20 (hereinafter simply expressed by a provisional conversion table) is first generated (step (hereinafter expressed by STP) 1). FIG. 19 shows an example of the above described provisional conversion table 20. The example shown in FIG. 19 is an example of interpolating a curve into the vicinity of the position 18*c* of the pointer 19 shown in the map area 14*a*. The provisional conversion table 20 contains the coordinate data, the animation time, and the information about the existence/non-existence of an interpolated curve.

The example shown in FIG. 19 shows the interpolation of a curve into the reference line 18 at the position 18*c*. The record area corresponding to the existence/non-existence of the interpolation of a curve is set as YES, and other areas corresponding to the existence/non-existence of the interpolation of a curve is set as NO. The setting 'YES' can be entered by setting a flag at a corresponding storage area, and the setting 'NO' can be entered by not setting a flag at a corresponding storage area. In, addition, the provisional conversion table 20 is generated using a keyboard, etc. not shown in the attached drawings.

After generating the provisional conversion table 20 as described above, an after-interpolation conversion table is generated (STP 2). The process is performed based on the provisional conversion table 20 using, for example, an algorithm such as a spline, a B spline, a bezier curve, etc. For example, when a spline function is used, the line curved at the position 18*c* is smoothly formed. In addition, a smooth curve can be obtained using a bezier curve.

FIG. 20 shows an after-interpolation conversion table. The after-interpolation conversion table 21 is generated using a spline function, etc. as described above. According to the present embodiment, the range from the position 18*e* to the position 18*c* is interpolation-processed. That is, data is interpolated at the three points represented by the X coordinate of 85, the Y coordinate of 132, and the animation time of 04:18; the X coordinate of 87, the Y coordinate of 142, and the animation time of 04:34; and the X coordinate of 94, the Y coordinate of 148, and the animation time of 04:50.

When the conversion table 20 is completed as described above, the subsequent reference line 18 is displayed (STP 3). The reference line is displayed in the map area 14a according to the above described table.

Then, the pointer 19 is displayed (STP 4). The pointer 19 is also displayed at the initial starting position 18a. Next, a data input from the user is awaited (STP 5).

When the after-interpolation conversion table 21 is completed as described above, the user specifies the pointer 19 on the curve slider 17 (reference line 18) using a pointing device. For example, when the temperature and the humidity at the position 18b are to be obtained, the user moves the pointer 19 to the position 18b using a mouse. In this case, the coordinate data of the specified pointer 19 is first obtained, the above described after-interpolation conversion table 21 is searched, the corresponding temperature and humidity data is read, and the read data is displayed in the temperature and humidity level display 15c. If the corresponding operation target is animation data, then the animation data at the corresponding position can be displayed in an animation area.

Figure 21:
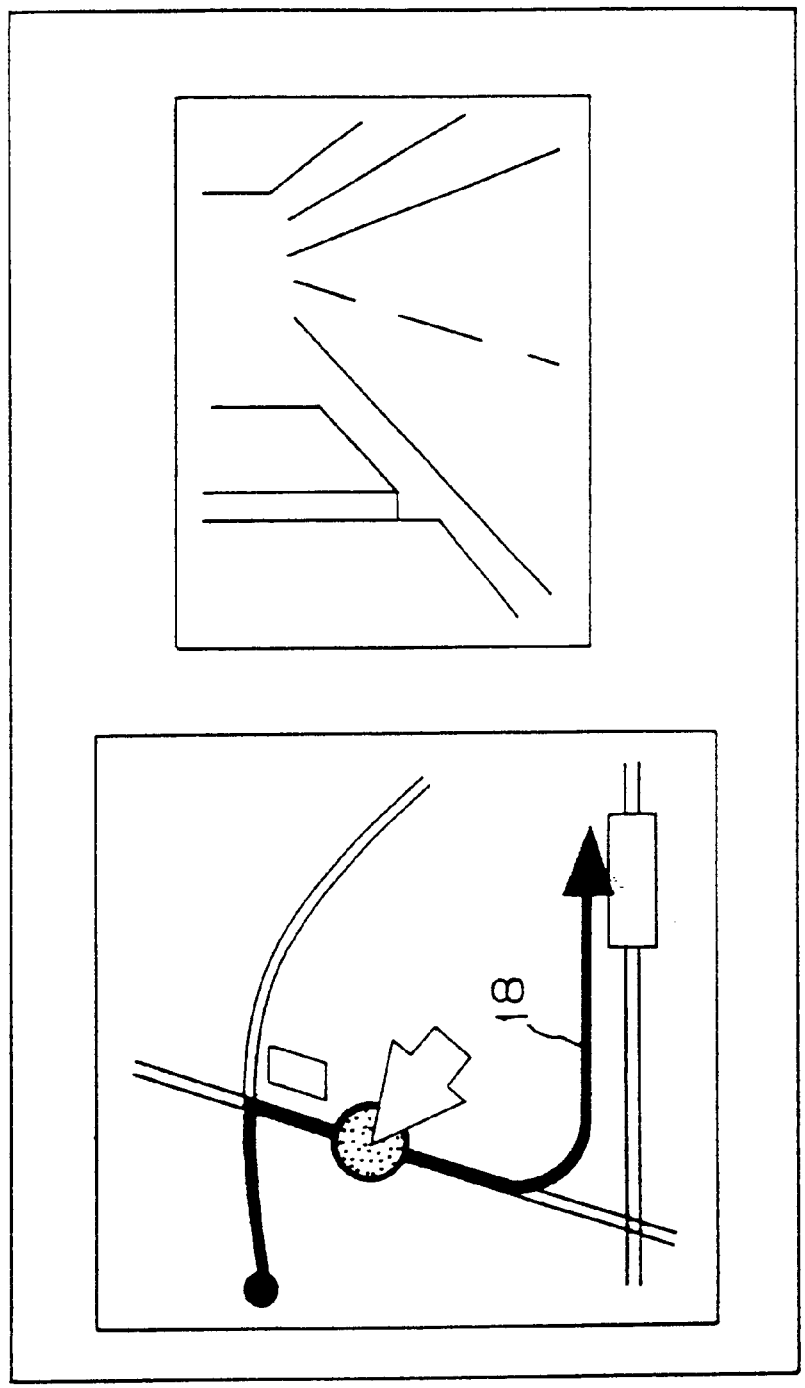
FIG. 21 shows the state of the display according to the fourth embodiment of the present invention.

In the above described process, the reference line 18 in the vicinity of the position 18c becomes smoother as shown in FIG. 21, thereby obtaining a more detailed information.

<Fifth Embodiment>

Described below is the fifth embodiment of the present invention.

According to the present embodiment, the shape or the color of the reference line 18 is changed. The shape or the color of the reference line are changed with the change of an operation target, thereby informing the user of a larger volume of information and improving the operability. In addition, according to the present embodiment, the system shown in FIG. 2 comprises the computer 10, the display 11, and the conversion table 13. The display 11 is, for example, a display unit of the computer 10. The present embodiment can be described in detail using the following two examples.

First Example

Figure 22:
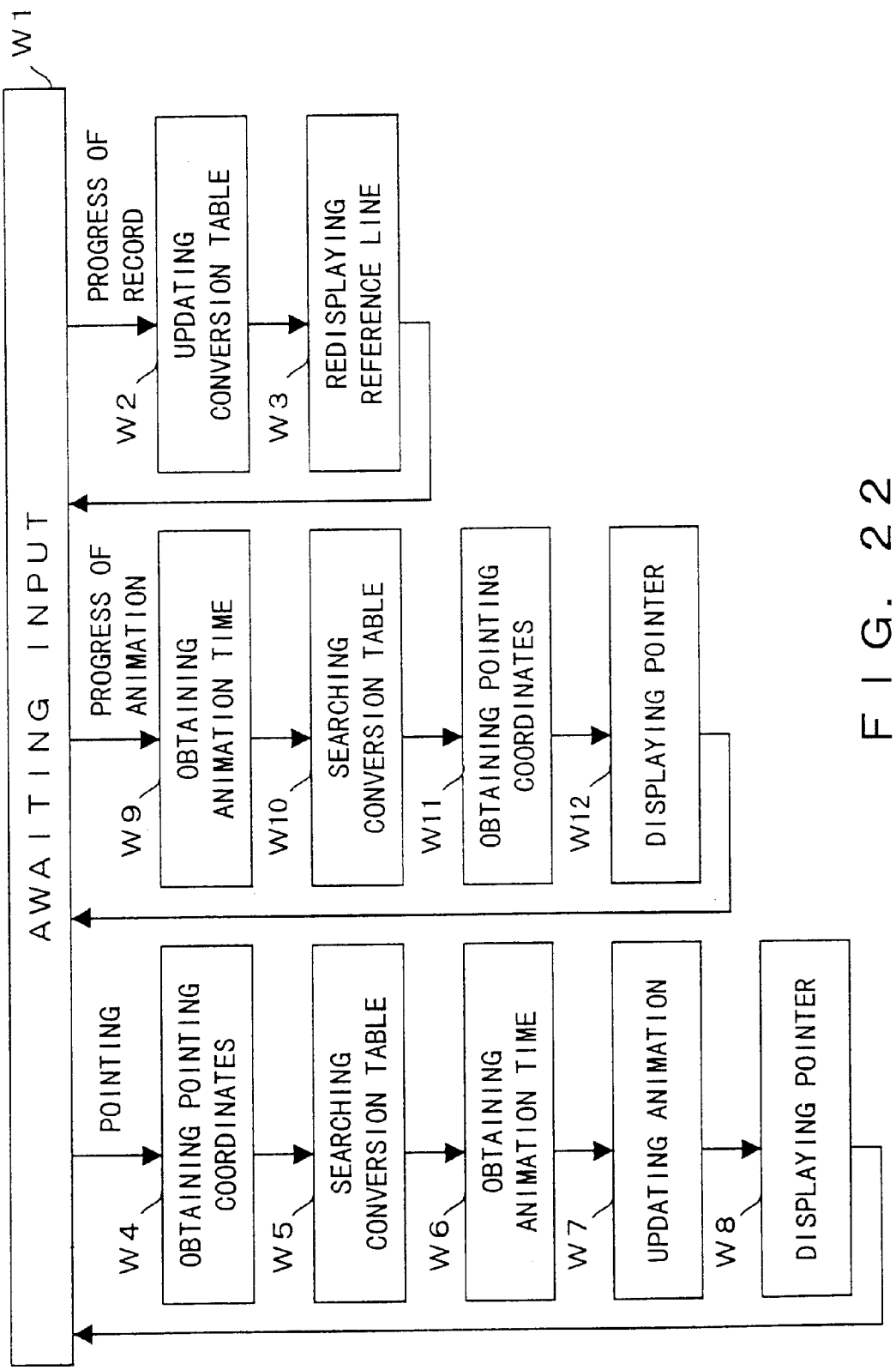
FIG. 22 is a flowchart showing the fifth embodiment of the present invention.

FIG. 22 is a flowchart according to the present embodiment. In the present example, a course (reference line), is not preliminarily determined as in the first through third embodiment. For example, a course (reference line) is set, and simultaneously a recording operation is performed. Therefore, the pointer 19 is located at the position of the starting position 18a, and the data input from the user is awaited (step (hereinafter expressed by W) 1).

Figure 23A:
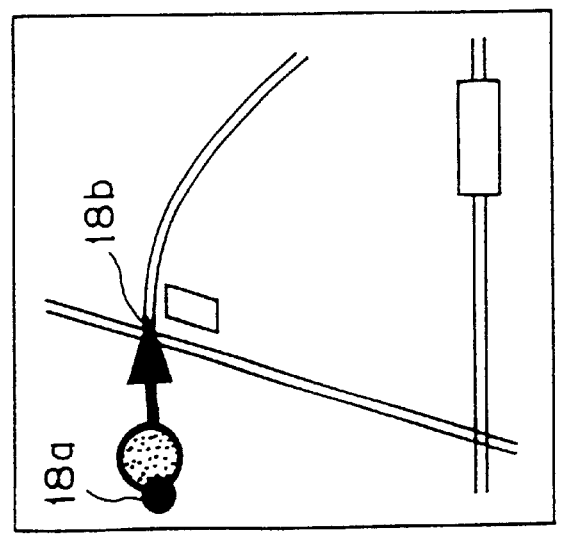
FIGS. 23A, 23B, and 23C show the state of a display change according to the fifth embodiment of the present invention.
Figure 23B:
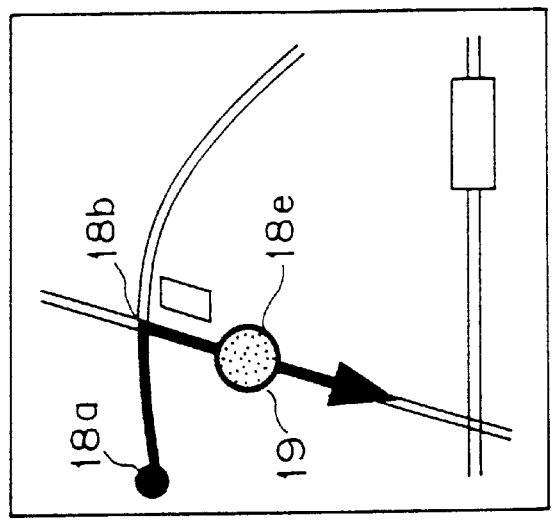
Figure 23C:
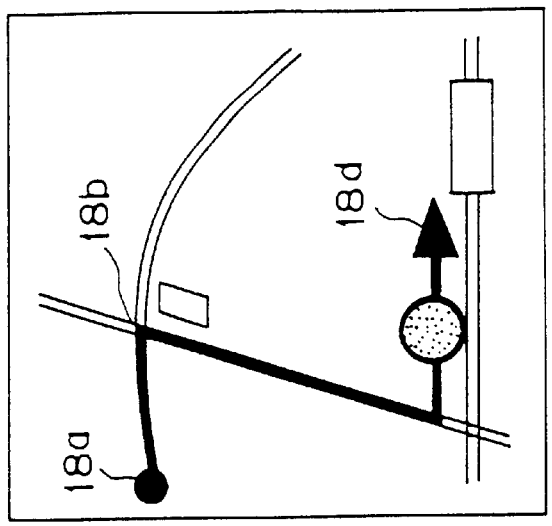
Figure 25:
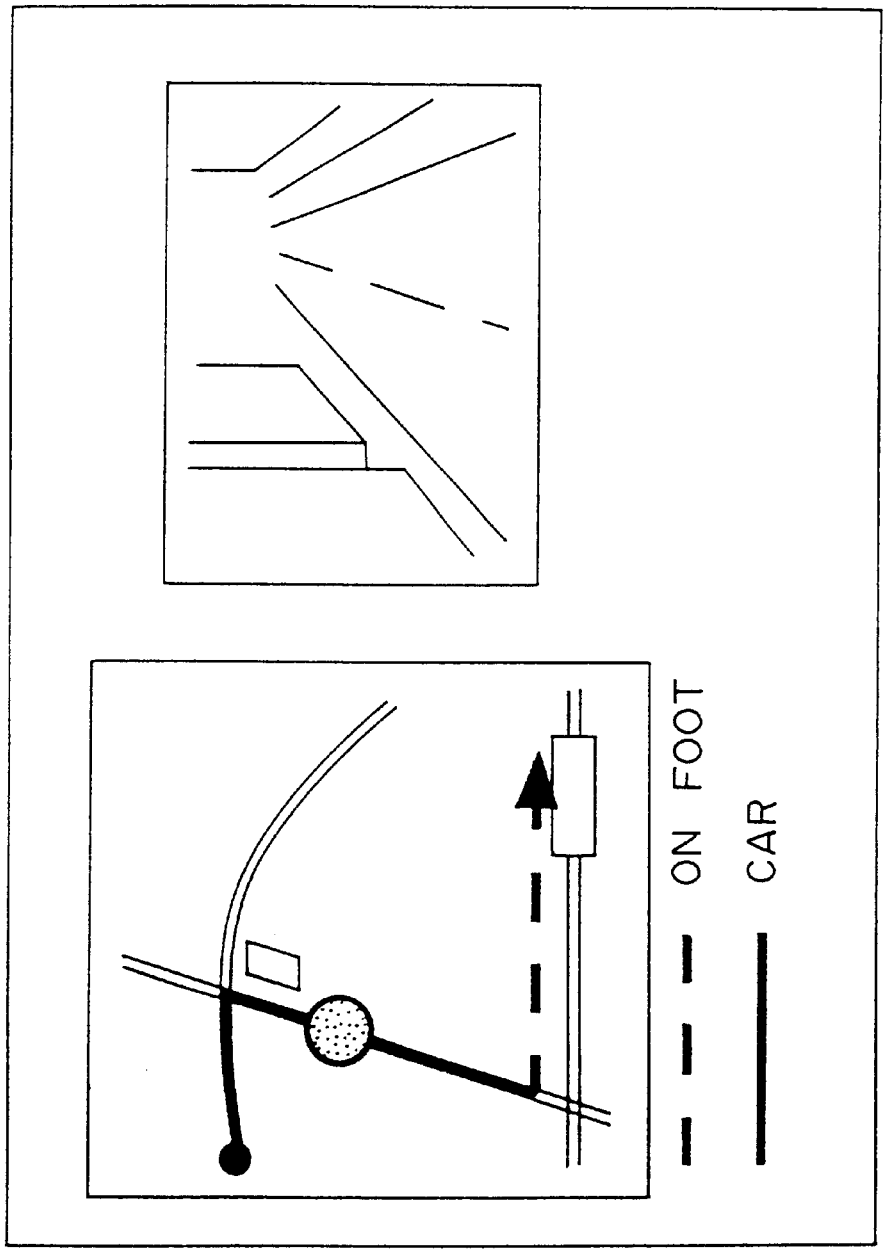
FIG. 25 shows an example of the configuration of the memory of the conversion table according to the fifth embodiment of the present invention.

In this state, when the recording operation goes on, the conversion table is updated (W2). FIG. 23 shows the case in which the above described record is updated. First, FIG. 12A shows the state in which an image recorder uses, for example, a car, starts recording images; from the starting position 18a, and reaches the position 18b, that is, an intersection. During the process, the course is recorded, and the recording data is stored in the memory not shown in the attached drawings. In addition, the animation time from the start of the recording operation is counted, and the animation time is recorded in the conversion table with the coordinate position of the route of the movement. Furthermore, the map area 14a is displayed in FIG. 23A (W3).

The above described recording process is progressed each time a camera is moved to update the conversion table. For example, if the process reaches the position 18e shown in FIG. 23B, then the animation time and the coordinate data are written to the corresponding storage area of the conversion table, and the pointer 19 is also displayed at the corresponding position (W3). When it is moved to the position shown gin FIG. 23C, the conversion table updating process and the redisplaying process of the reference line 18 are also performed.

In the above described process, the shape of the reference line 18 is extended with the progress of the recording operation, and a change in shape allows the progress of the recording operation to be known. That is, the reference line 18 is extended with the movement of the camera, the ending position of the reference line 18 is the position of the current camera, and the position of the current camera and the movement route can be easily obtained.

On the other hand, when the animation at an optional position corresponding to the movement route (reference line 18) is displayed, the process performed according to the above described embodiment can be adopted. That is, in this case, when the user specifies a desired position on the reference line 18 using the pointing device 12, a specified coordinate data is obtained (W4), the generated conversion table is retrieved (W5), and the data of the animation time is obtained from the coordinate data (W6). Then, the animation data (shot data) is read, the animation data is updated (W7), and the pointer 19 is displayed on the corresponding reference line 18.

In addition, the animation can be inversely progressed without operating the pointing device 12 to confirm the generated reference line and the animation. In this case, in the input wait state (W1), the animation time is obtained with the progress of the animation (W9), the conversion table is inversely searched from the data at the obtained animation time (W10), and the coordinates of the point corresponding to the animation position are obtained (W11). Then, finally, the pointer 19 is displayed in the map area 14a (W12).

Therefore, according to the present embodiment, the animation can be regenerated without waiting for the completion of recording images, thereby improving the efficiency of operations. Furthermore, as described above, the form of the reference line can be extended with the progress of recording images, and a change in the form of a reference line allows the progress of recording images to be knows.

When the route is determined before recording images, the reference line is extended to the ending position when the image recording operation starts, and the color of the reference line is changed with the progress of recording images.

Second Example

FIG. 24 shows an example of a conversion table 25 according to the present embodiment. The process according to the, present example is the same as that shown in FIG. 7, the process of generating a conversion table 24, the process of displaying the reference line 18, and the process of displaying the pointer 19, and the process of generating the conversion table 24 is performed as follows.

First, the x and Y coordinates of the starting position 18a are read, and the animation time is set. . When the X coordinate of the starting position 18a is 120, and the Y coordinate is 70, the above described X and Y coordinate data is written to the first storage line (storage area) of the conversion table 24. If a car is used as a moving means to move from the starting position 18a, then, for example, a code number for which corresponding information is preliminarily set is entered. The specification continues up to the next position 18b for the information about the input car.

Then, if the next coordinate position on the reference line 18 is the position 18b, then 150 is written as the X coordinate, 64 is written as the Y coordinate, and 01:20 is written as a corresponding animation time. In addition, if the moving means is a car again, the same code number as mentioned above is entered. As, described above, the specification continues up to the next position 18c for the input information about the car.

Furthermore, if the next coordinate position is 18c on the reference line 18, then 130 is written as the X coordinate, 145 is written as the Y coordinate, and 04:25 is written as a corresponding animation time. In addition, if the moving means is different from the above described case, that is, if the moving means is 'feet', then the corresponding information is input with a preliminarily set code number.

Then, finally the coordinate data, 166 as the X coordinate and 147 as the Y coordinate, of the ending position 18d is written, and '08:54' is written as the corresponding ending animation time. Since the position 18 is the ending position, no code number is input to the storage area of the moving means. As in the above described case, the specification of the information about 'feet' continues up to the ending position 18d.

If the conversion table 24 has been completed as described above, then the reference line 18 is displayed. The reference line displaying process is performed by forming the reference line 18 in the map area 14a according to the generated conversion table 24. For example, in consideration of the code number of the storage area of the moving means in the conversion table 24, the shape of the color of the reference line 18 is changed. Since the moving means is a car from the starting position 18a through an intermediate position 18c according to the present example, it is indicated by a solid line. Since the moving means from the position 18c to the ending position 18d is feet, for example, it is indicated by dotted lines. FIG. 24 shows an example of displaying a reference line generated in the above described process.

By displaying the reference line 18 as described above, the user can specify a desired range to quickly regenerate target animation when the animation is to be viewed by displaying the reference line 18, for example, when the range of the movement by a car is to be viewed, or when the range of the movement on foot is to be viewed.

<Sixth Embodiment>

Described below is the sixth embodiment of the present invention.

The fifth embodiment of the present invention has the configuration in which the shape or the color of a reference line is changed. According to the present embodiment, the shape or the color of the pointer 19 is changed, and the direction of a camera and the type of a moving means can be clarified by changing the shape and the color of the pointer 19 with a change of an operation target, thereby informing the user of a larger amount of information. Also according to the present embodiment, the system is based on the configuration shown in FIG. 2, and comprises the computer 10, the display 11, and the pointing device 12. The display 11 is, for example, a display unit of the computer 10. Described below is a practical description.

FIG. 26 shows an example of the conversion table 25 according to the present embodiment. The process performed according to the present invention is the same as the process according to each of the above described embodiments. That is, sequentially the conversion table 25 is generated, a reference line is displayed, and a pointer is displayed. The process of generating the conversion table 25 is performed as follows.

First, the X coordinate and the Y coordinate of the starting position 18a is read, and the animation time is set. Also, when animation is shot, the information about the direction of a camera is obtained, and the information about the direction of the camera is written to the conversion table 25. For example, in the example shown in FIG. 26, the X coordinate at the starting position 18a is 120, and the Y coordinate is 70. The animation time of 00:00 is written, and the information about the direction of the camera (for example, 15°) is also written.

If the next coordinate position on the reference line 18 is the position 18b, then 150 is written as the X coordinate, 64 is written as the Y coordinate, and 01:20 is written as the corresponding animation time. In addition, for example, 252° is written as the information about the direction of the camera.

Furthermore, if the next coordinate position on the reference line 18 is the position 18c, then 128 is written to the X coordinate of the conversion table 25, 145 is written to the Y coordinate, and 04:25 is written as the animation time. Then, for example, 0° is written as the information about the direction of a camera. Finally, 166 and 147 are written respectively as the coordinate data about the X and Y coordinates of the ending position 18d, and 08:54 is written as the corresponding ending animation time. For example, 0° is written as the information about the direction of the camera.

The above described coordinate data, the animation time, and the information about the direction of a camera can be recorded for the positions other than the above described positions, or can be recorded at predetermined intervals.

Figure 27:
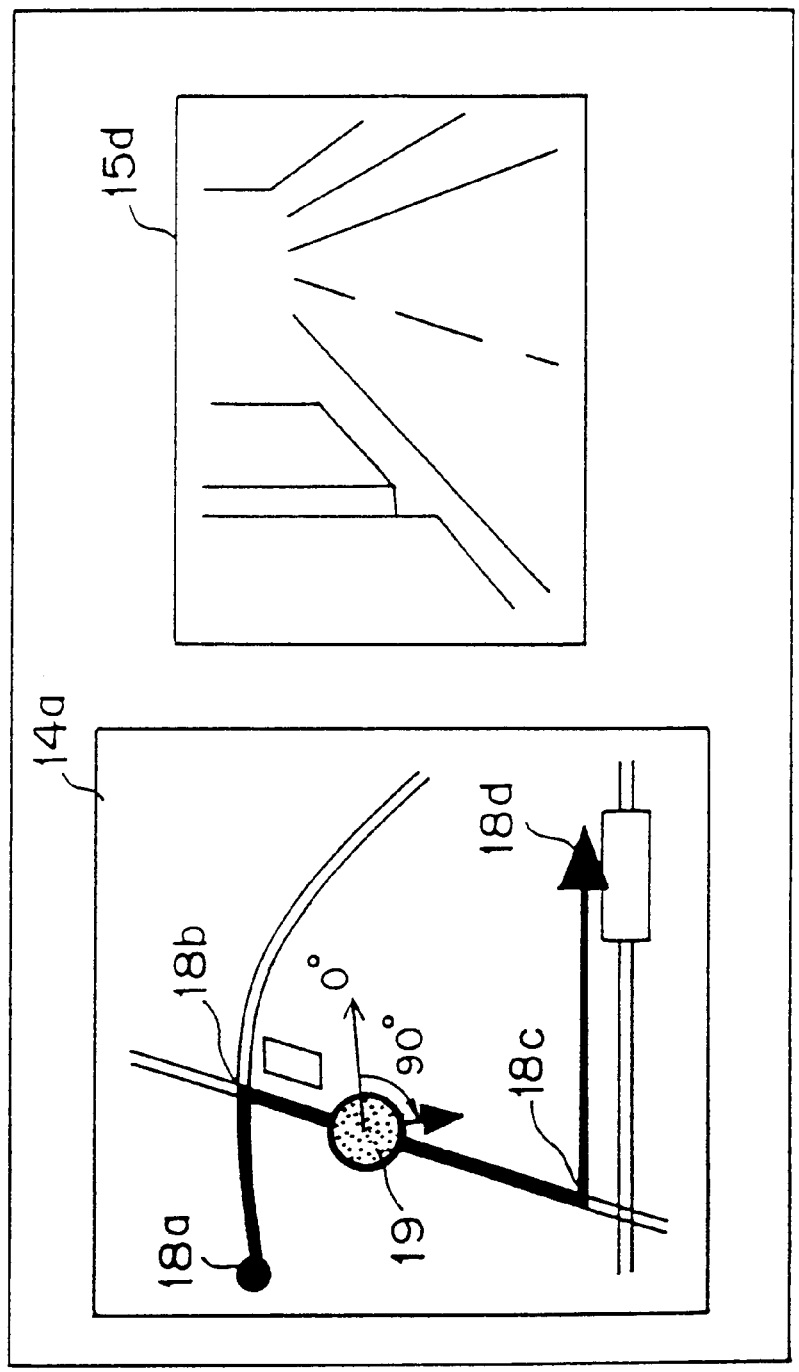
FIG. 27 shows the state of the display according to the sixth embodiment of the present invention.
Figure 29:
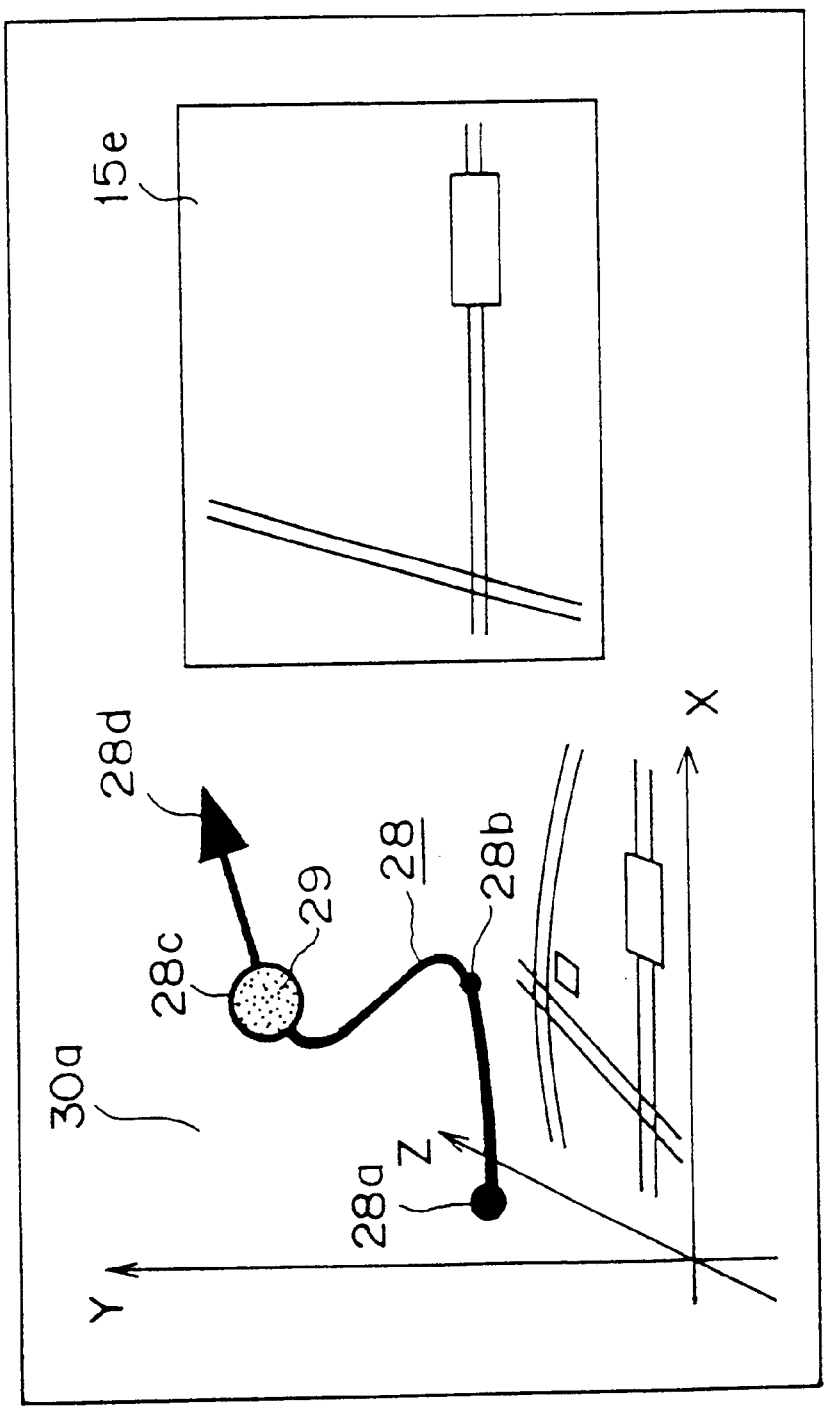
FIG. 29 shows the state of the display according to the seventh embodiment of the present invention.

When the conversion table 25 is completely generated as described above, the reference line 18 and the pointer 19 are displayed. Although the reference line 18 is displayed by linking coordinate data as described above, the pointer 19 is generated including the information about the direction of the camera. In the example shown in FIG. 27, the direction is 90° if the initial direction of the camera is 0°. In addition, the animation image in the direction of the camera is displayed in an animation area 15d.

As described above, the direction of a camera is indicated by an arrow, and the arrow is provided for the pointer 19. Thus, it can be easily known from which direction of the pointer 19 the animation displayed in the animation area 15d has been shot, thereby improving the operability and more clearly indicating the meaning of the animation.

In the above descriptions, an arrow mark is added to the pointer 19 depending on the direction of the camera, but different colors can be applied to the pointer 19 depending on the moving means. For example, if the moving means is a car, the pointer 19 is expressed in, blue. If the moving means is a bicycle, it is expressed in green. If the moving means is feet, it is expressed in red, and so on. Thus, the moving means can be immediately recognized.

In the explanation about the above described embodiments, the display of the pointer can be changed by the direction of the camera. However, when a sound is processed, the display of the pointer can be changed by the direction of a sound collecting microphone.

<Seventh Embodiment>

Described below is the seventh embodiment of the present invention.

According to the above described first through sixth embodiments, a reference line is generated for a map area in the two-dimensional display. However, according to the present embodiment, a reference line is generated for a map area in the three-dimensional display, and an animation display can be performed in a larger space by moving the pointer 19 on the corresponding reference line. More practical explanation is given below.

FIG. 28 shows an example of a conversion table 26 explaining the present embodiment. According to the present embodiment, a reference line is generated for a map area in the three-dimensional display as described above, and the pointer 19 is moved on the reference line. The coordinate area of the conversion table 26 comprises an X coordinate, Y coordinate, and Z coordinate. The position data is written to each coordinate area. In addition, the animation time data at each position is written to the corresponding area.

That is, the conversion table 26 is generated as follows. First, the X, Y, and Z coordinates of a starting position 28a are read, and the animation time '00:00' is written. In this case, for example, the X coordinate '140', the Y coordinate '98', and the Z coordinate '50' are written to the coordinate area of the conversion table 26, and in addition, the above described animation time '00:00' is written.

If the next coordinate position on the reference line 28 is 28b, the X coordinate '277', the Y coordinate '100', and the Z coordinate '70' are written to the coordinate area, and in addition, the animation time '01:01' is written. If the next coordinate position on the reference line 28 is 28c, the X coordinate '224', the Y coordinate '176', and the Z coordinate '97' are written to the coordinate area, and in addition, the animation time '02:14' is written.

Finally, if the last coordinate position on the reference line 28 is 28d, the X coordinate '347', the Y coordinate '190', and the Z coordinate '128' are written to the coordinate area, and in addition, the animation time '03:37' is written.

After the conversion table 26 has been completely generated as described above, a reference line 28 is displayed. The process of displaying the reference line 28 is performed by reading the coordinate data from the conversion table 26, and connecting each point, thereby generating the reference line 28 as shown in a map area 30a. In an animation area 15e, the animation viewed from the corresponding three-dimensional position is displayed. Furthermore, a shot image from an object moving in a three-dimensional area can be displayed. For example, when an aerial map is generated, the position on the map matches the position of an image by displaying an image shot from an airplane, helicopter, etc. moving in the three-dimensional area, thereby performing an efficient operation.

In this example, an operation target is a shot image as a dynamic object. However, it can be processed as a static object, or a combination of dynamic and static objects. The data displayed as a static object can be weather information at a point (for example, air pressure, wind direction, temperature, humidity, etc.), and a photo or a static image of a specific target from each point (for example, a building on the ground).

According to the present embodiment, as in the fifth embodiment, the shape or the color of the reference line 18 can be changed, and the shape or the color of the pointer 19 can be changed as in the sixth embodiment.

In the descriptions of the above described embodiments, it is necessary to input a large volume of display coordinate data and operation target data. Therefore, it is advantageous if there is any effective method for automatically obtain display coordinate data and operation target data. For example, when a map is interlocked with animation, the position data is provided by the GPS (global positioning system) and automatically stored while animation is shot to generate a conversion table. In addition, coordinates can be amended by also using various types of map information systems.

Figure 30:
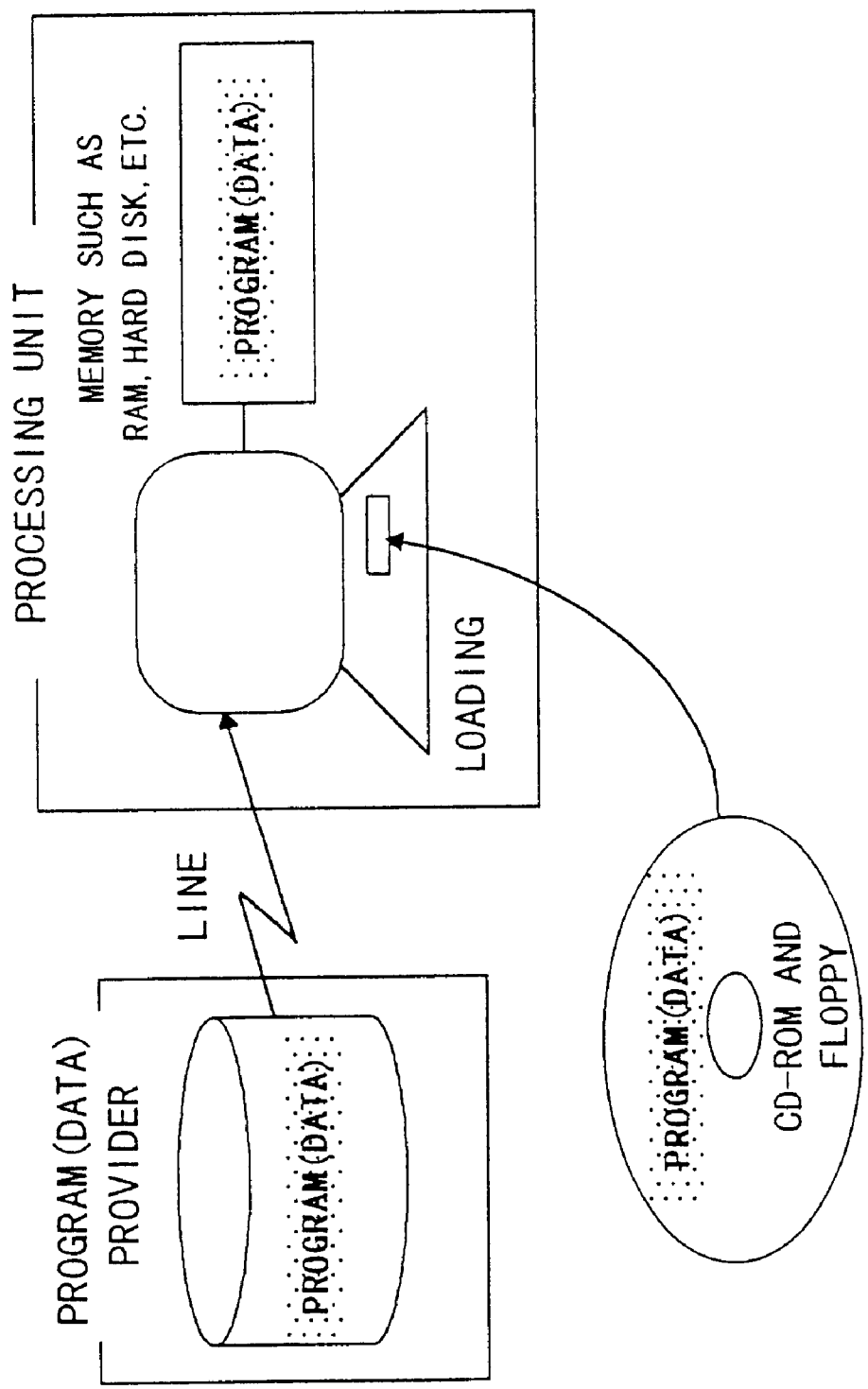
FIG. 30 shows the configuration of the system using a storage medium.

On the other hand, FIG. 30 shows a system for realizing a process according to the present embodiment by storing a program of a data accessing process according to the present embodiment in a portable storage medium such as a floppy disk, CD-ROM, etc. and the memory of an external storage device such as a hard disk, etc., and inserting the storage medium into the drive of a computer. The process according to the present embodiment can also be realized by downloading a program according to the present embodiment from a program provider to the computer through a communications line of Internet, a LAN, a WAN, etc.

As described above, the position of a pointer moving on a reference line is moved to a desired position to display the animation on an operation target display unit, thereby clearly indicating the correspondence between a pointer on a reference line and animation, and obtaining an excellent curve slider apparatus.

What is claimed is:

1. A curve slider apparatus comprising:

a coordinate display unit displaying a curve slider formed by a reference line and a pointer moving on the reference line;

an operation target display unit displaying a corresponding operation target object at a position of the pointer on the reference line;

a conversion table storing a coordinate position of the reference line displayed on the coordinate display unit, and corresponding data corresponding to an object displayed on the operation target display unit; and a control unit controlling a movement of the pointer on the reference line and a regeneration of an object corresponding to a position of the reference line according to the conversion table such that the movement and the regeneration can be displayed as being interlocked.

2. A curve slider apparatus comprising:

a coordinate display unit displaying a curve slider displayed in a map area and formed by a reference line and a pointer moving on the reference line;

an operation target display unit displaying a corresponding object at a position of the pointer on the reference line;

a conversion table storing a coordinate position of the coordinate display unit, and correspondence data corresponding to an object displayed on the operation target display unit; and a control unit controlling movement of the pointer on the reference line and regeneration of an object corresponding to a position of the reference line according to a coordinate position stored in the conversion table such that the movement and the regeneration can be displayed as being interlocked.

3. The apparatus according to claim 1, wherein said coordinate display unit and said operation target display unit are displayed on a same display.

4. The apparatus according to claim 1, wherein a position specified by a pointer on the reference line is specified by a pointing device.

5. The apparatus according to claim 1, wherein:

said object displayed on said operation target display unit is an object obtained along a movement route of an optional moving unit;

said reference line is a curve substantially corresponding to the movement route; and a shape or a color of the reference line can be varied depending on the moving unit.

6. The apparatus according to claim 1, wherein
said control unit controls, based on data obtained by interpolating data between data in the conversion table, movement of the pointer on the reference line and regeneration of an object corresponding to a position of the reference line according to the conversion table such that the movement and the regeneration can be displayed as being interlocked.

7. The apparatus according to claim 1, wherein:
said object displayed on said operation target display unit is an object obtained along a movement route of an optional moving unit;
said reference line is a curve substantially corresponding to the movement route; and
a shape or a color of the pointer can be varied depending on the direction in which the object is obtained.

8. The apparatus according to claim 1, 2, 3, 4, 5, 6, or 7 wherein said operation target is a dynamic object.

9. The apparatus according to claim 1, 2, 3, 4, 5, 6, or 7 wherein said operation target is a static object.

10. The apparatus according to claim 9, wherein
said static object is formed by a combination of at least one or more graphs, tables, text, photos and static images.

11. The apparatus according to claim 1, 2, 3, 4, 5, 6, or 7 wherein said operation target is a combination of a dynamic object and a static object.

12. The apparatus according to claim 10, wherein
data displayed as said static object is data indicating at least one of a temperature, a humidity, and voice information.

13. The apparatus according to claim 1, wherein
coordinate data displayed on said coordinate display unit is generated using a global positioning system.

14. A curve slider method comprising:
displaying coordinates for displaying a curve slider formed by a reference line and a pointer moving on the reference line;
displaying a corresponding operation target object at a position of the pointer on the reference line;
generating a conversion table storing a coordinate position of the reference line displayed in the coordinate displaying step, and corresponding data corresponding to an object displayed in the operation target displaying step; and
controlling a movement of the, pointer on the reference line and a regeneration of an object corresponding to a position of the reference line according to the conversion table such that the movement and the regeneration can be displayed as being interlocked.

15. A computer-readable storage medium storing a program for directing a computer to perform a curve slider controlling process comprising:
displaying a curve slider formed by a reference line and a pointer moving on the reference line;
displaying a corresponding operation target object at a position of the pointer on the reference line; and
based on a coordinate position of a reference line generated on a computer system, and a conversion table storing corresponding data corresponding to an object displayed in the operation target displaying step, controlling a movement of the pointer on the reference line and a regeneration of an object corresponding to a position of the reference line according to the conversion table such that the movement and the regeneration can be displayed as being interlocked.

* * * * *